United States Patent [19]

Metcalfe et al.

[11] Patent Number: 5,608,821
[45] Date of Patent: Mar. 4, 1997

[54] METHOD OF HIGH ADDRESSABILITY ERROR DIFFUSION

[75] Inventors: David J. Metcalfe, Marion; Jeng-Nan Shiau, Webster; Leon C. Williams, Walworth, all of N.Y.

[73] Assignee: Xerox Corporation, Stamford, Conn.

[21] Appl. No.: 285,326

[22] Filed: Aug. 3, 1994

[51] Int. Cl.⁶ ........................................ G06K 9/36
[52] U.S. Cl. .................. 382/252; 382/237; 382/299; 358/429; 358/445; 358/447; 358/457
[58] Field of Search ................... 358/429, 445, 358/447, 455–458, 461; 382/237, 252, 299

[56] References Cited

U.S. PATENT DOCUMENTS 4,829,587  5/1989  Glazer et al. ........................ 382/299
5,258,854  1/1993  Eschbach ............................. 358/455
5,327,256  7/1994  Kang et al. .......................... 382/299
5,410,615  4/1995  Mailloux ............................. 382/299

Primary Examiner—Leo Boudreau
Assistant Examiner—Bipin Shalwala
Attorney, Agent, or Firm—Michael J. Nickerson

[57] ABSTRACT

A method and system implements a high addressability characteristic into an error diffusion process. A grey level value representing a pixel is received. The grey level value has a first resolution which corresponds to an original input resolution. The grey level value is interpolated to generate subpixel grey level values which correspond to a second resolution. The second resolution is higher than the first resolution and corresponds to the high addressability characteristic. A threshold circuit thresholds the interpolated grey level value and generates an error value as a result of the threshold. The error value has a resolution corresponding to the first resolution. A portion of the error value is diffused to adjacent pixels on a next scanline.

13 Claims, 21 Drawing Sheets

Desired Output = $\dfrac{P0_i + P1_i}{2}$

Actual Output = $\dfrac{n*255}{N}$

Actual Output = $\dfrac{a*255}{N}$

METHOD OF HIGH ADDRESSABILITY ERROR DIFFUSION

FIELD OF THE PRESENT INVENTION

The present invention is directed to an error diffusion method for rendering grey images on binary output devices. More specifically, the present invention is directed to an error diffusion process having high addressability so that grey images can be rendered on an output device.

BACKGROUND OF THE PRESENT INVENTION

There are many methods of rendering grey images on an output device. Moreover, error diffusion can render complex images that contain a mixture of text and picture reasonably well. This utilization of error diffusion eliminates the need to have image segmentation to separate the text from the picture so that the picture aspect of the document can be screened and the text aspect of the document can be threshold.

FIG. 1 illustrates a typical error diffusion technique. In Step S1 of this process, the video signal for pixel X is modified to include the accumulated error diffused to this pixel from previous threshold processes. The modified video signal value (X) is compared at Step S2 with the value 128, assuming a video range between 0 and 255. If Step S2 determines that the modified video signal value (X) is greater than or equal to 128, the process proceeds to Step S4 wherein a value is output to indicate the turning ON of pixel X. The process then proceeds to calculate the error associated with the threshold process at Step S6 wherein this error, Y, is calculate as being X–255.

On the other hand, if Step S2 determines that the modified video signal value (X) is less than 128, a signal is output at Step S3 indicating that the pixel X is to be turned OFF. The process then proceeds to Step S5 wherein the error, Y, is calculated as being equal to the value X.

The error calculated in either Steps S5 or S6 is multiplied by weighting coefficients and distributed to downstream pixels in Step S7. Thus, the error from the threshold process is diffused to adjacent pixels. The coefficients conventionally used to diffuse the error to adjacent downstream pixels are illustrated in FIG. 2.

In FIG. 2, X represents the current pixel being thresholded. The weighted error from this threshold process is diffused to adjacent downstream pixels according to preselected coefficients. For example, the weighting coefficient for the next pixel in the same scanline conventionally is 7/16, whereas the coefficient for the pixel that is one over in the fast scan direction and one down in the slow scan direction from the currently processed pixel is 1/16.

This method provides good results, but with advances in marking or printing technology, a new error diffusion method is needed. More specifically, it has become possible to pulse width modulate a laser to print images with high addressability. To use error diffusion in combination with high addressability, one cannot simply perform the error diffusion at the high spatial resolution corresponding to the high addressability because the resulting subpixels would be too small for a typical print engine to render. Thus, it is desired to develop an error diffusion technique which can be effectively utilized with the present day highly addressable image output terminals without producing subpixels too small for rendering.

SUMMARY OF THE PRESENT INVENTION

A first aspect of the present invention is a method of diffusing error generated from thresholding a grey level value representing a pixel. The method receives the grey level value representing the pixel wherein the grey level value has a first resolution. The grey level value is converted to a second resolution, the second resolution being higher than the first resolution. The converted grey value is then thresholded and an error is generated as a result of the threshold process. The error value has a resolution corresponding to the first resolution. The error is diffused to grey level values representing adjacent pixels.

A second aspect of the present invention is a system for diffusing error generated from thresholding a grey level value representing a pixel. This system includes input means for receiving the grey level value representing the pixel, the grey level value having a first resolution and high addressability means for converting the grey level value to a second resolution, the second resolution being higher than the first resolution. Threshold means thresholds the converted grey level value, and error means generates an error value as a result of the threshold. The error value has a resolution corresponding to the first resolution. Error diffusing means diffuses the error value to grey level values representing adjacent pixels.

A third aspect of the present invention is a method of generating an error from a threshold process. The method thresholds a grey level value of a pixel having a first resolution. An error value is generated as a result of the threshold of the grey level value. The error value has a second resolution wherein the second resolution is lower than the first resolution.

A fourth aspect of the present invention is a system for generating an error from a threshold process. The system includes threshold means for thresholding a grey level value of a pixel having a first resolution and error means for generating an error value as a result of the threshold. The error value has a second resolution which is lower than the first resolution.

A fifth aspect of the present invention is a binary printing system for rendering marks on a receiving medium. The binary printing system includes input means for receiving a grey level signal corresponding to a pixel and having a first resolution. Interpolation means converts the grey level signal to a second resolution which is higher than the first resolution. Binarization means binarizes the converted grey level signal so as to output a binary signal and an error signal. The error signal has a resolution equal to the first resolution. Diffusing means diffuses the error value to grey level signals corresponding to pixels adjacent to the binarized pixel. Lastly, rendering means converts the binary signal into a mark on the receiving medium.

Further objects and advantages of the present invention will become apparent from the following descriptions of the various embodiments and characteristic features of the present invention.

BRIEF DESCRIPTION OF THE DRAWINGS

The following is a brief description of each drawing used to describe the present invention, and thus, are being presented for illustration purposes only and should not be limitative of the scope of the present invention wherein.

DETAILED DESCRIPTION OF THE DRAWINGS

Figure 1:
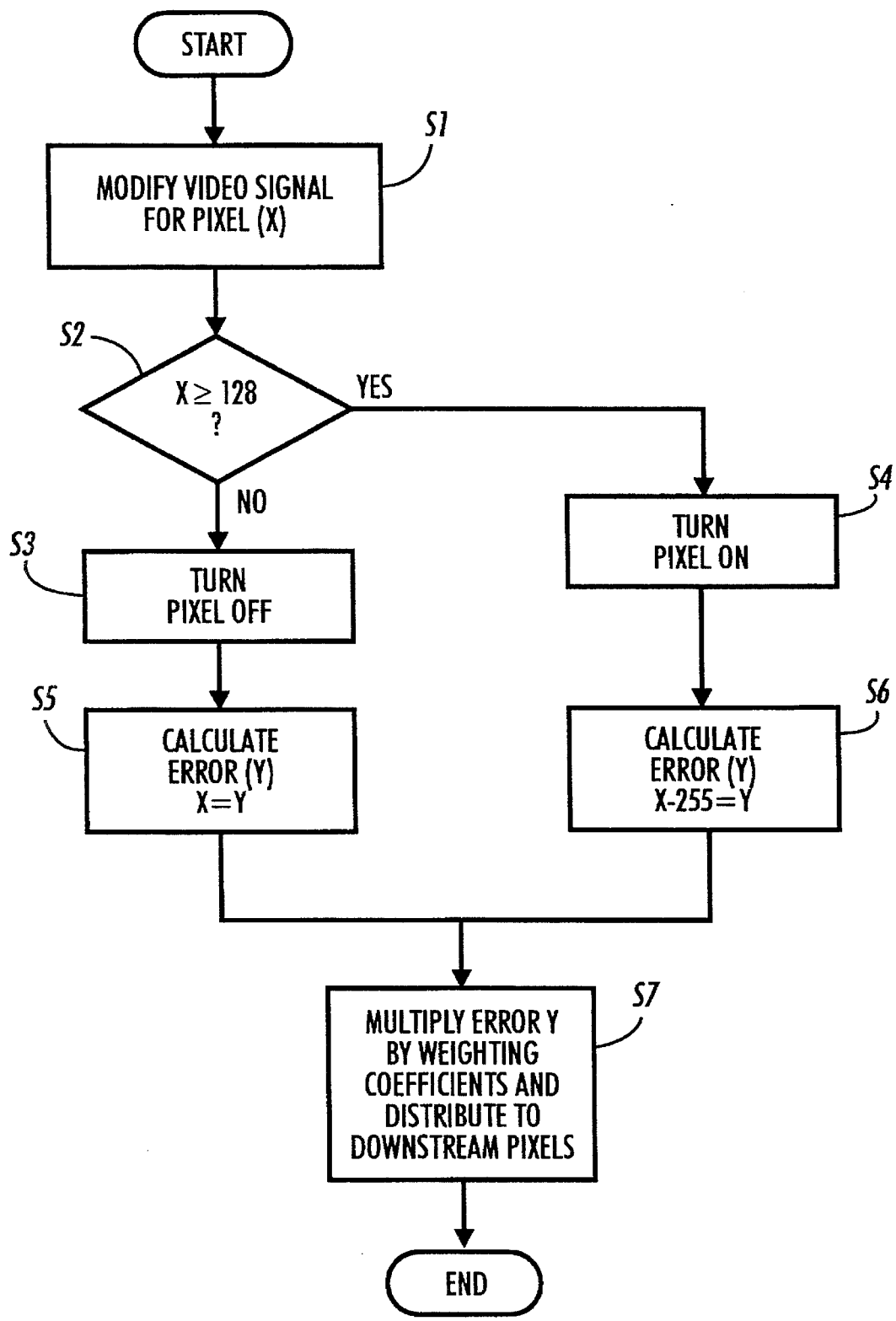
FIG. 1 shows a flowchart illustrating a typical error diffusion method.
Figure 2:
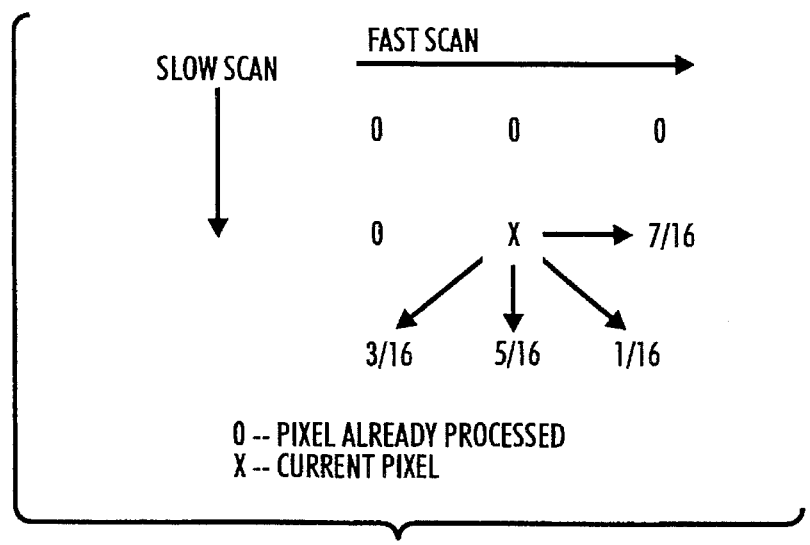
FIG. 2 shows a diagram illustrating a typical weighting coefficient scheme.

The following will be a detailed description of the drawings illustrating the present invention. In this description, as well as in the drawings, like reference numerals represent like devices, circuits, or equivalent circuits performing the same or equivalent functions.

In describing the present invention, it is assumed that the video value in a range between 0 and 255. However, any chosen range for the video signal can be utilized in conjunction with the present invention. As described above, in conventional error diffusion methods, the printing of the pixels is determined by comparing a modified input with a threshold. The modified input video signal is the input video signal, V, plus an accumulated error term, $e_i$, determined from the processing of previous pixels. If the modified input video signal of the pixel is greater than or equal to the threshold, the output is a logical one and an error term of $V+e_i-255$ is propagated to the downstream pixels. If the modified input video signal is less than the threshold, the logical output is 0 and an error of $V+e_i$ is propagated downstream.

It is noted that the present invention is being described for a binary system. However, the concepts the present invention are readily applicable to four level systems, etc.

To extend the conventional error diffusion process to a high addressability environment, the binarization (threshold) is performed at a higher spatial resolution, but the error computation and propagation is performed at the original lower spatial resolution. This splitting of the process substantially prevents or reduces the number of isolated subpixels, thereby maintaining high image quality. This high resolution/low resolution method of the present invention will be explained in more detail below.

In explaining the high addressability error diffusion process, it is assumed that the input grey level at pixel location i and pixel location i+1 is represented by $V_i$ and $V_i+1$, respectively. The pixel values are assumed to be 8 bit integers wherein, for the sake of explanation, 0 denotes white and 255 denotes black. The rendering error, at the lower resolution, that passes from upstream pixels to the downstream pixel location is denoted by $e_i$.

It is noted that a feature of high addressability involves interpolation between pixels, the creation of subpixels. This interpolation impacts the high addressability error diffusion process. More specifically, depending on the way the interpolation is done, two distinct outputs can be obtained utilizing the high addressability error diffusion process of the present invention. Each one of these distinct outputs will be discussed below.

As noted above, the high addressability error diffusion process of the present invention produces two distinct outputs depending upon the interpolation scheme. With respect to a first interpolation scheme, the steps for determining the printing or rendering of a subpixel are as follows.

Figure 3:
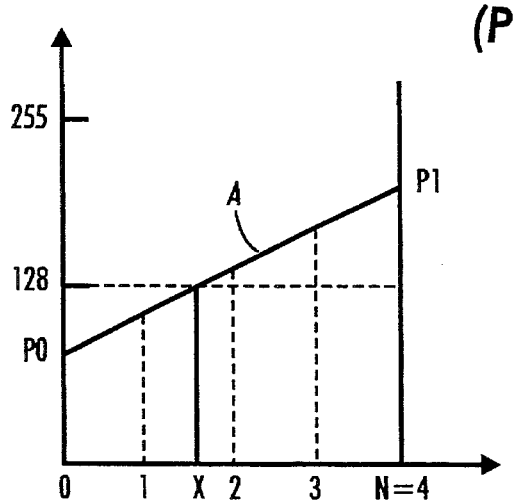
FIG. 3 shows a graph illustrating subpixel interpolation for one embodiment of the present invention.

Initially, the modified pixel values $P0_i=V_{i-1}+e_{i-1}=P1_{i-1}$ and $P1_i=V_i+e_i$ are computed at two locations corresponding to the input resolution. In this example, as illustrated in FIG. 3, the subpixels are denoted by 0 to N−1. In FIG. 3, the high addressability characteristic, N, is equal to 4.

As illustrated in FIG. 3, a line is drawn to connect the values P0 and P1. (The i subscripts have been dropped for simplicity.) Moreover, a dotted line is drawn to represent a threshold value of 128. (Again, it is noted that 0 to 255 is the range of the video signal; however, any range can be utilized.) The intersection of the line connecting P0 and P1 and the line representing the threshold at 128 determines which subpixels are to be rendered or printed. The X coordinate of the point of intersection is determined and normalized to N by the equation X=N (128−P0)/(P1−P0).

Next, it is determined which subpixels are to be turned ON. If X is less than or equal to 0 and if P1 is greater than or equal to 128, all the subpixels are ON; otherwise, all the subpixels are OFF. This decision represents the complete rendering or non-rendering of the pixel. To determine a partial rendering of the whole pixel, a subpixel analysis must be performed. In this instance, the value X must be compared to the individual subpixel values.

It is noted, as illustrated in FIG. 3, that the value of X does not necessarily compute to a whole number or subpixel, thereby making any analysis include a fractional component. To avoid this, X is converted to a whole number or subpixel value. For this conversion, n is allowed to be equal to the truncated integer value of X. The values n and X can then be utilized to determine which subpixels are to be turned ON and which subpixels are to be turned OFF. More specifically, if X is greater than 0, but less than n, and if P1 is less than 128, only the subpixels from 0 to n are turned ON and the rest of the subpixels are turned OFF; otherwise, the subpixels from 0 to n are turned OFF and the rest are turned ON. If X is greater than or equal to n and if P0 is greater than or equal to 128, all subpixels are turned ON; otherwise, all subpixels are turned OFF.

This threshold process produces an error which needs to be propagated to downstream pixels. Moreover, as noted above, the error needs to be at the original low resolution input. The conversion to the original resolution is realized by determining the difference between the desired output, (P0+P1)/2, and the actual output, namely b*255/N where b is the number of subpixels that were turned ON. The converted error is then multiplied by a set of weighting coefficients and distributed to the downstream pixels.

Figure 4:
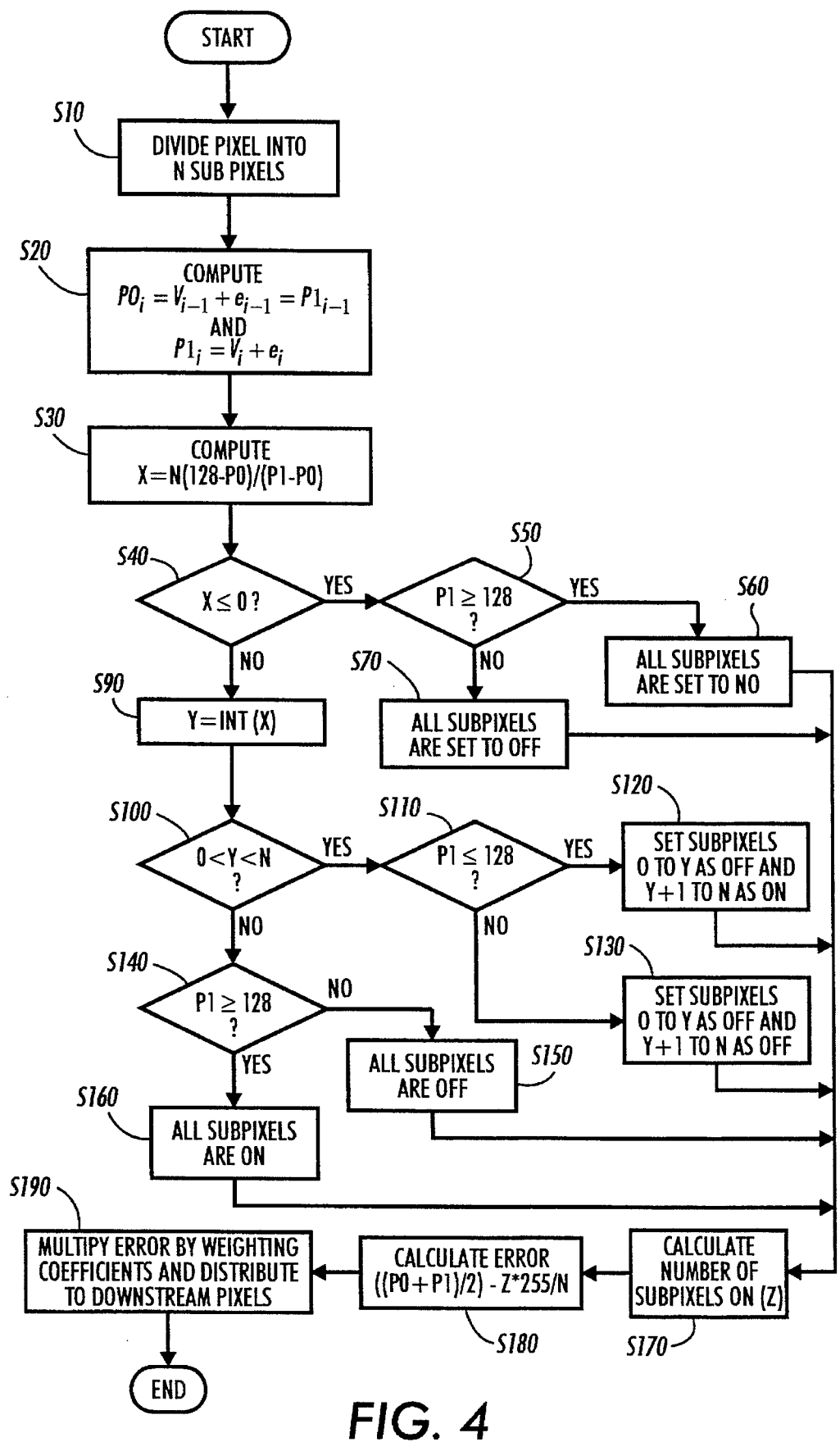
FIG. 4 shows a flowchart illustrating the error diffusion method using the interpolation schemes of FIG. 3.

FIG. 4 illustrates the actual method utilized to carry out the interpolation and error distribution process described above. In FIG. 4, at Step S10, the modified video input signal is divided into N subpixel values. At Step S20, the values $P0_i$ and $P1_i$ are calculated as described above. Next, at Step S30, the X-coordinate of the point of intersection is determined and normalized by multiplying the difference between 128 and P0 by the value N and dividing this product by the difference of P1 and P0. At Step S40, the normalized value X is compared with the value 0. If X is less than or equal to 0, Step S50 compares the value P1 with the value 128. If the value P1 is greater than or equal to 128, all the subpixels are set to an ON state at Step S60. However, if P1 is less than 128, Step S70 sets all the subpixels to an OFF state.

On the other hand, if Step S40 determines that X is not less than or equal to 0, Step S90 determines the integer value of X and sets this integer value equal to Y. At Step S100, the integer value Y is compared with the values 0 and N. If the value Y lies between 0 and N, Step S110 determines whether the value P1 is less than or equal to 128. If the value PI is less than or equal to 128, Step S120 sets the subpixels 0 to Y to the ON state and the subpixels Y+1 to N to the OFF state. However, if Step S110 determines that the value P1 is greater than 128, Step S130 sets the subpixels 0 to Y to the OFF state and the subpixels Y+1 to N to the ON state.

If Step S100 determines that the value Y is not between the values 0 and N, Steps S140 determines whether the value P1 is greater than or equal to 128. If the value P1 is greater than or equal to 128, Step S160 sets all subpixels to the ON state. However, if Step S140 determines that the value P1 is less than 128, Step S150 sets all the subpixels to the OFF state.

Upon completing the processes at either Steps S60, S70, S120, S130, S150, or S160, the error diffusion method of the present invention proceeds to Step S170. At Step S170, the number of ON subpixels is calculated and set equal to Z. Next, at Step S180, the error to be propagated to the downstream pixels is calculated. Namely, the error is calculated to represent the original low spatial resolution. Upon calculating the error in Step S180, Step S190 multiplies the error by weighting coefficients and distributes the weighted error terms to downstream pixels.

The second interpolation method with respect to implementing the high addressability error diffusion method of the present invention will be describe as follows.

Figure 5:
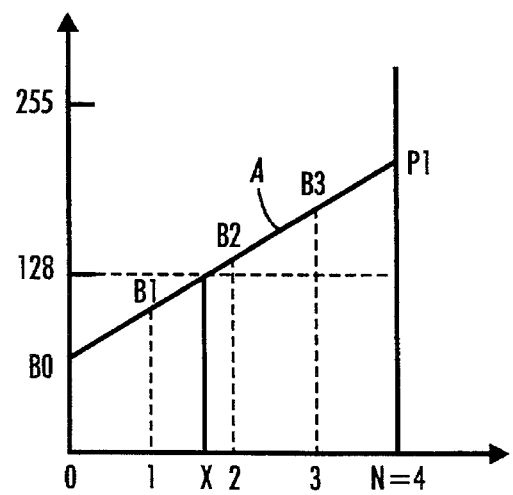
FIG. 5 shows a graph illustrating subpixel interpolation for a second embodiment of the present invention.

Initially, the modified pixel values $P0_i=V_i+e_i$ and $P1_i=V_{i+1}+e_i$ are computed. FIG. 5 illustrates the values P0 and P1 for the second version of the high addressability error diffusion method of the present invention. As in the first method, the subpixels are denoted by 0 to N−1 wherein, as in the previous case, the high addressability characteristic is N=4.

The interpolated subpixel values are computed as $B_n=P0+n(P1-P0)/N$ for n=0 to N−1. The interpolated subpixel values are then compared with a threshold value which in the preferred embodiment is 128, assuming that the video value ranges from 0 to 255.

If $B_n$ is greater than or equal to 128, the subpixel is turned ON; otherwise, the subpixel is turned OFF. In the second version, the error to be propagated to downstream pixels is computed as the desired output, (P0+P1)/2, minus the actual output, namely, y*255/N wherein y is the number of subpixels turned ON. The error is then multiplied by a set of weighting coefficients and distributed to the downstream pixels as in the first version.

Figure 6:
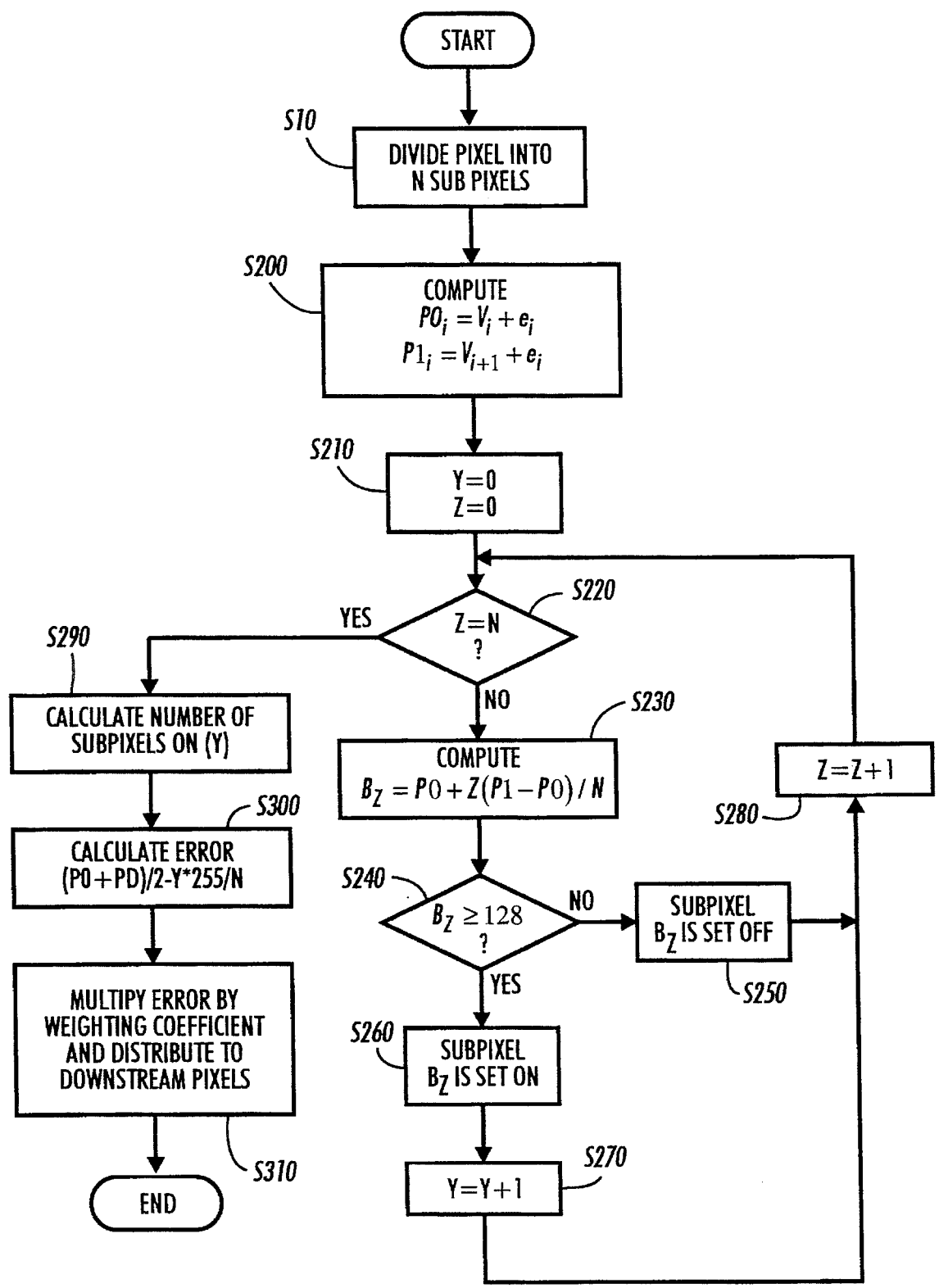
FIG. 6 shows a flow chart illustrating the error diffusion method of the present invention using the interpolation scheme of FIG. 5.

FIG. 6 illustrates the process utilized in the second interpolation version of the high addressability error diffusion method of the present invention. As in the FIG. 4, the inputted modified video signal is divided into N subpixel units at Step S10. At Step S200, the P0 and P1 values are computed as noted above. At Step S210, the values Y and Z are set equal 0, wherein Y denotes the number of subpixels which are to be turned ON and Z denotes the addressability factor. At Step S220, Z is compared with N to determined whether all the subpixels within the modified video signal have been thresholded. If it is determined that subpixels remain to be thresholded, the process moves to Step S230 wherein the next subpixel value is computed. Step S240 then compares the computed subpixel value with the threshold value, namely 128. If the subpixel value is greater than or equal to the threshold value, Step S260 sets the subpixel value to the ON state, and Step S270 increments the value Y indicating the number of subpixels that are set ON. However, if the subpixel value is less than 128, Step S250 sets the subpixel value to OFF.

Upon the completion of either Step S250 or Step 270, the process proceeds to Step S280 wherein the high addressability value Z is incremented. This subroutine is repeated until all subpixel values within the modified video signal are compared with the threshold value. Upon completing the comparison of all subpixel values, the process advances to Step S290 wherein the number of ON subpixels are calculated. At Step S300, the error from the threshold process is calculated so that the value represents the original lower spatial resolution. Upon calculating the error, Step S310 multiplies the error by weighting coefficients and distributes the error to downstream pixels.

Figure 7:
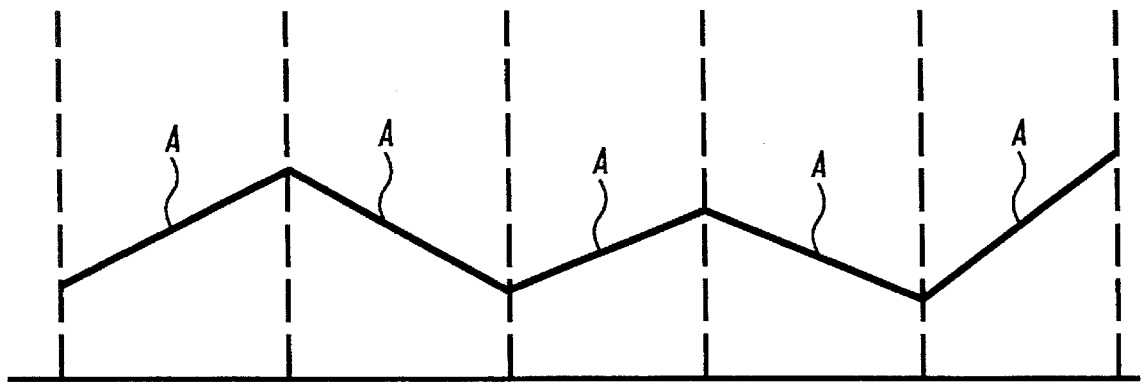
FIG. 7 and 8 show graphs illustrating the subpixel relationships for the interpolation schemes of FIGS. 3 and 5.

FIG. 7 illustrates the high addressability relationship between adjacent pixels utilizing the first interpolation version of high addressability error diffusion method. More specifically, it is noted that the P1 value of the present pixel is utilized as the P0 value for the next pixel.

Figure 8:
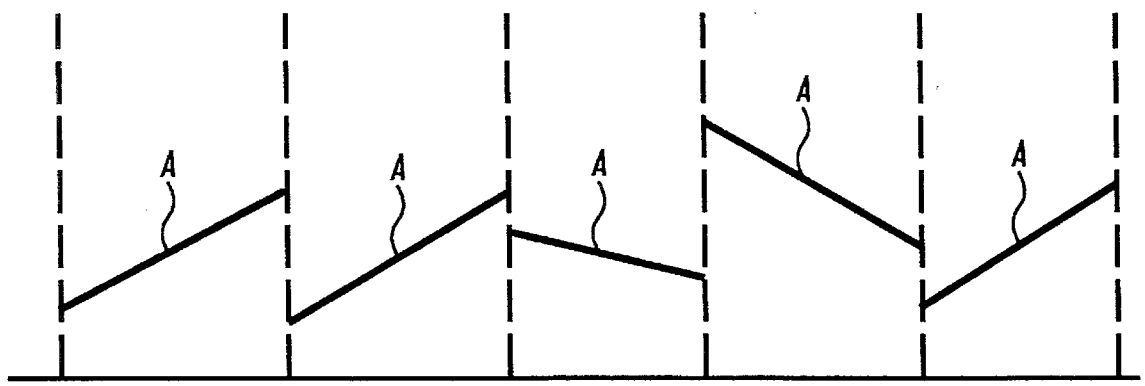

On the other hand, FIG. 8 illustrates the high addressability relationship between pixels utilizing the second interpolation version of the high addressability error diffusion method. In this case, there is discontinuity between the P1 value of the previous pixel and the P0 value of the present pixel. Thus, from these two Figures, it can be seen that the error output from the two versions of the high addressability error diffusion methods will be different.

The actual circuit utilized to implement the high addressability error diffusion will be described briefly below. A full discussion of the circuit is disclosed in a co-pending application, U.S. patent application Ser. No. 08/285,572, filed concurrently herewith and will be discussed below.

Error diffusion is a well known method of processing grey scale images on a binary output device. One of the key ingredients in error diffusion is a requirement to propagate or diffuse the error which is generated by reducing (binarizing) the grey level value of a grey scale image.

Recently, improved features have been added to the typical error diffusion method. Specifically, it has been proposed to utilize high addressability error diffusion. A brief description of high addressability error diffusion will follow.

In explaining the high addressability error diffusion process, it is assumed that the input grey level at pixel location i and pixel location i+1 is represented by $V_i$ and $V_i+1$, respectively. The pixel values are assumed to be 8 bit integers wherein, for the sake of explanation, 0 denotes white and 255 denotes black. The rendering error, at a resolution lower than the addressability resolution, that passes from upstream pixels to the downstream pixel location is denoted by $e_i$.

It is noted that a feature of high addressability involves interpolation between pixels, the creation of subpixels. This interpolation impacts the high addressability error diffusion process. More specifically, depending on the way the interpolation is done, distinct outputs can be obtained utilizing a high addressability error diffusion process. One such method of interpolation is as follows.

Figure 9:
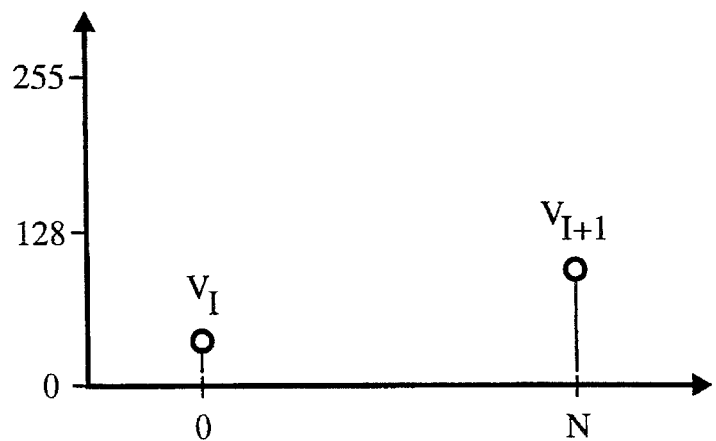
FIG. 9 shows a graphical representation of obtaining boundary subpixel values.
Figure 10:
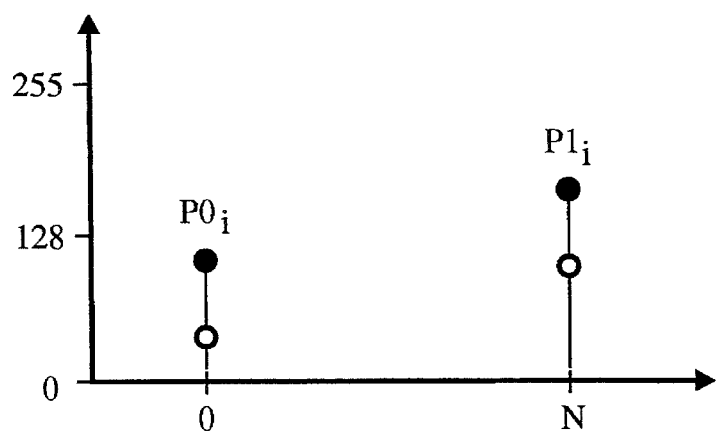
FIG. 10 shows a graphical representation of modifying the obtained boundary subpixel values with an error component.

FIGS. 9–15 illustrate the computational steps required to perform high addressability error diffusion using a particular interpolation scheme. Initially, as illustrated in FIG. 9, the pixel value $V_i$ and $V_{i+1}$ are obtained. The actual pixel values are graphically illustrated in FIG. 9, wherein the pixel value $V_i$ represents the pixel value at the subpixel position 0 and the pixel value $V_{i+1}$ represents the pixel value at the N–1 subpixel. In FIG. 9, the pixel values range from 0 to 255 utilizing a conventional eight bit dataword to represent the multi-level grey value of the image data to be process. It is noted that any range can be utilized to represent the grey level value of the image data; for example, 0 to 511,0 to 127, etc.

After obtaining the initial pixel values of $V_i$ and $V_{i+1}$, a diffused error component $e_i$ (the accumulated error from previous pixel binarization processes) is added to the pixel values $V_i$ and $V_{i+1}$. It is noted that the error component $e_i$ consists of two components, $e_{FIFO}$ and $e_{FB}$, where $e_{FIFO}$ is the summed error component stored in a line buffer and $e_{FB}$ is the feedback error component. The adding of the error component $e_i$ is illustrated graphically in FIG. 10.

Figure 11:
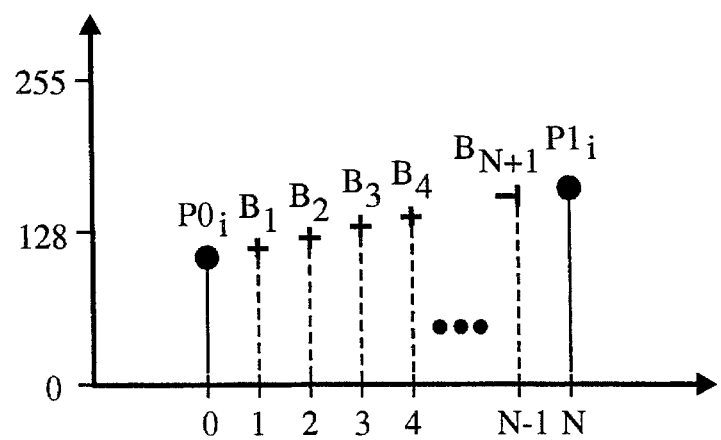
FIG. 11 shows a graphical representation of interpolating subpixel values between the modified boundary subpixel values.
Figure 12:
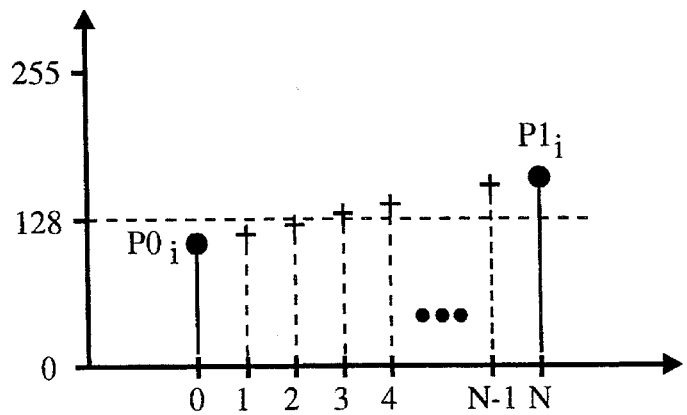
FIG. 12 shows a graphical representation of comparing the interpolated subpixel values with a threshold value.
Figure 13:
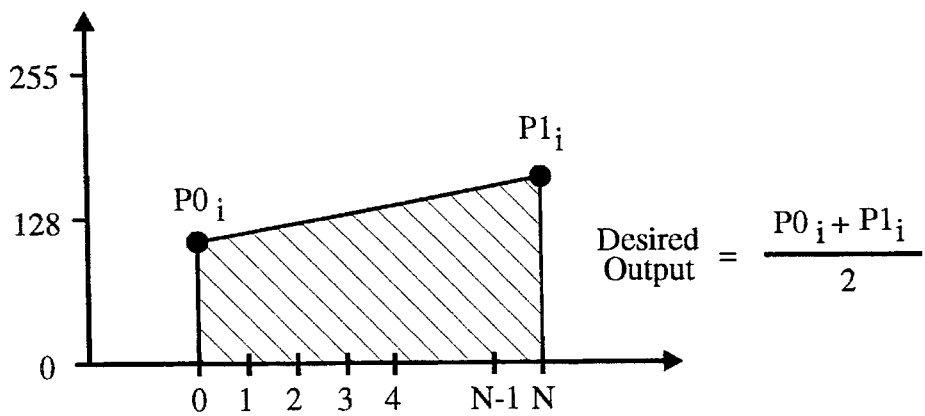
FIG. 13 shows a graphical representation of computing a desired output value.

After adding the diffused error component, the interpolated subpixel values are computed, as illustrated in FIG. 11. For example, the interpolated subpixel values are $B_n=P0_i+n(P1_i-P0_i)/N$ for n=0 to N–1, where N is the selected high addressability characteristic. It is noted that the value $P0_i$ is equal to $V_i+e_i$ and $P1_i$ is equal to $V_{i+1}+e_i$.

After computing the interpolated subpixel values, each interpolated subpixel value is compared to a threshold level. In the example illustrated in FIG. 12, the threshold value is 128. It is noted that this threshold value can be any value within the range of the image data depending upon the desired results. In this example, each subpixel which has a value greater than or equal to 128 is set ON.

Figure 14:
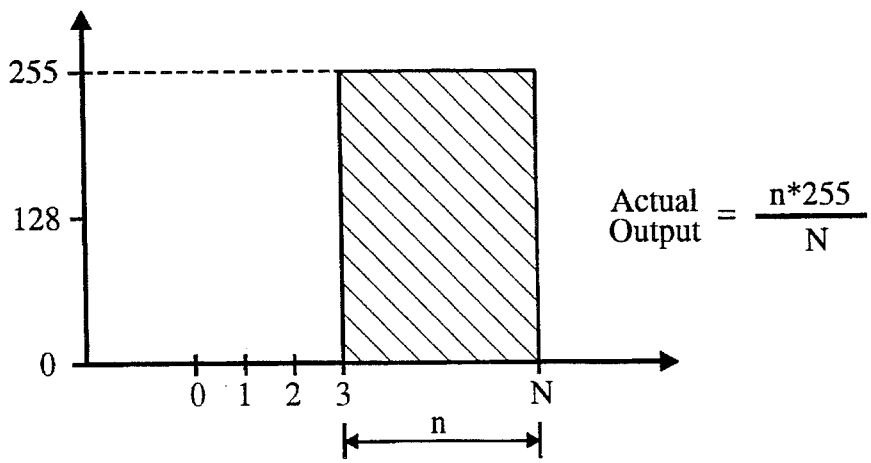
FIG. 14 shows a graphical representation of computing an actual output value.

Next, the desired output $(P0_i+P1_i)/2$ is computed. This computing of the desired output is graphically illustrated in FIG. 13. After computing the desired output, the actual output is computed. In this example, the actual output is equal to n*255/N where n is the number of subpixels that have been turned ON as the result of the comparison illustrated in FIG. 12. A graphical representation of the computed actual output is shown in FIG. 14.

Once the desired output and the actual output have been computed, the error diffusion method computes the error to be propagated downstream. This error is computed as the desired output minus the actual output. A graphical representation of this computation is shown in FIG. 15.

Figure 15:
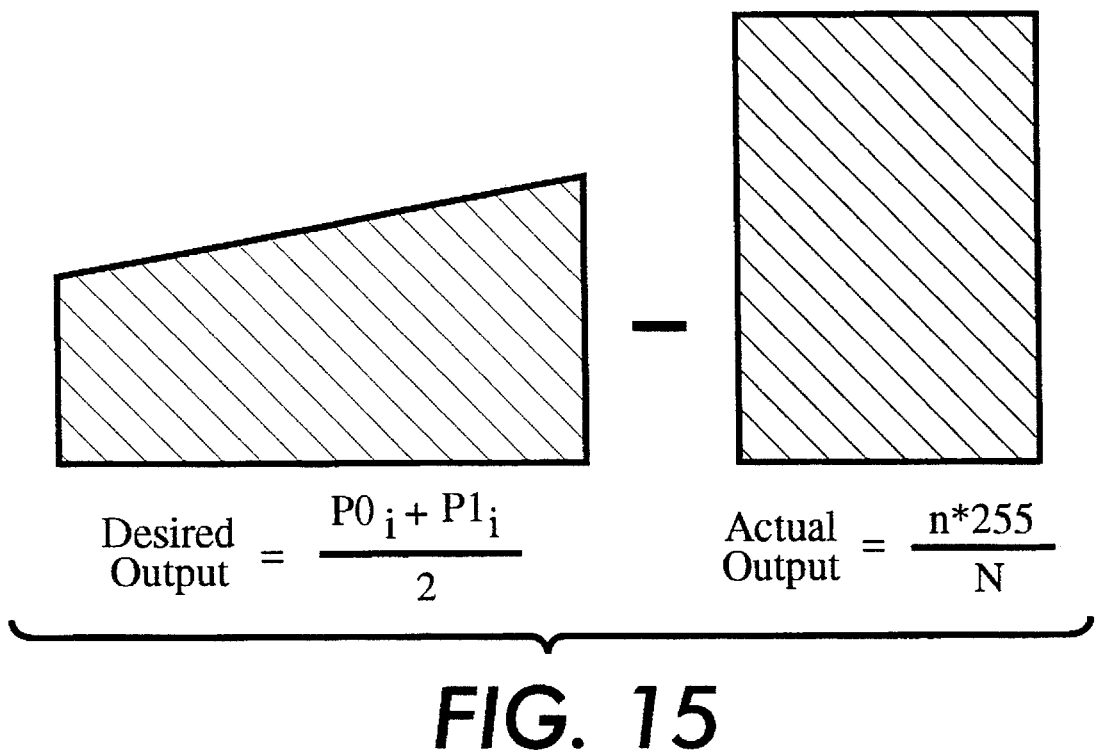
FIG. 15 shows a graphical representation of computing an error value to be propagated to downstream pixels.
Figure 16:
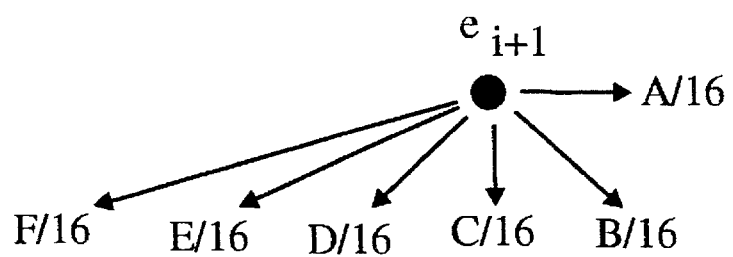
FIG. 16 shows a graphical representation illustrating actual distribution of the error in a typical error distribution routine.

As illustrated in FIG. 15, the error is calculated to be $e_{i+1}=(P0_i+P1_i)/2-(n*255/N)$. In this instance, the error $e_{i+1}$ represents the error from the present binarization process. As in all conventional error diffusion processes, the error from the binarization process is distributed to downstream pixels. The distributing of the error $e_{i+1}$ to downstream pixels is illustrated in FIG. 16. In this example, the distribution of error utilizes a set of error diffusion coefficients which allow fast processing by simple bit shifting. FIG. 16 illustrates the coefficients associated with each pixel location. An example of the exact coefficients are discussed in U.S. patent application, Ser. No. 08/167,758 . The entire contents of Ser. No. 08/167,758 are hereby incorporated by reference.

Although the above enhancement significantly improves the print quality of the images rendered via error diffusion, this improvement tends to make the computations more complex in terms of hardware design and time consuming. One of the most important drawbacks of this high addressability error diffusion improvement has been the time needed to make the complex computations. Although the computations can be implemented in a software environment, the time needed to produce binarized image data for rendering is too long to readily implement such a solution in mid-speed to high-speed printing or image rendering devices. More specifically, the exact correspondence between the high addressability error diffusion computations in software to that which is implemented in hardware is different due to the speed requirements imposed by a system's throughput specification. Therefore, it is desirable to design an unique hardware implementation of the high addressability error diffusion method to meet the time constraints of the present day image rendering devices.

As discussed above, the hardware implementation of the high addressability error diffusion must meet the time restraints of the throughput specifications of the image rendering device utilizing the high addressability error diffusion method. More specifically, to be implemented in present day image rendering devices, the error computation must be completed in one clock cycle, since half of the error is diffused to the next pixel in the fast scan direction. The error which is diffused downward in the slow scan direction is summed and stored in a buffer. This portion of the error is part of the distributed error component required for binarizing pixels on the next scanline. This summing, however, can be performed several cycles later, since this error component is not needed until the following scanline.

If there were no constraints set on the time allowed to process the subpixel and the corresponding error or if present day microprocessors were fast enough to meet the time constraints of present day imaging devices, the hardware required to achieve high addressability error diffusion would be fairly straight forward. In this situation, the number of subpixels to be set ON could be determined by simply calculating the intersection of the line containing the points $P0_i$ and $P1_i$ and 128. The error to be distributed downstream would then be calculated based upon the number of subpixels which are turned ON. A block diagram of this hardware implementation is illustrated in FIG. 17.

Figure 17:
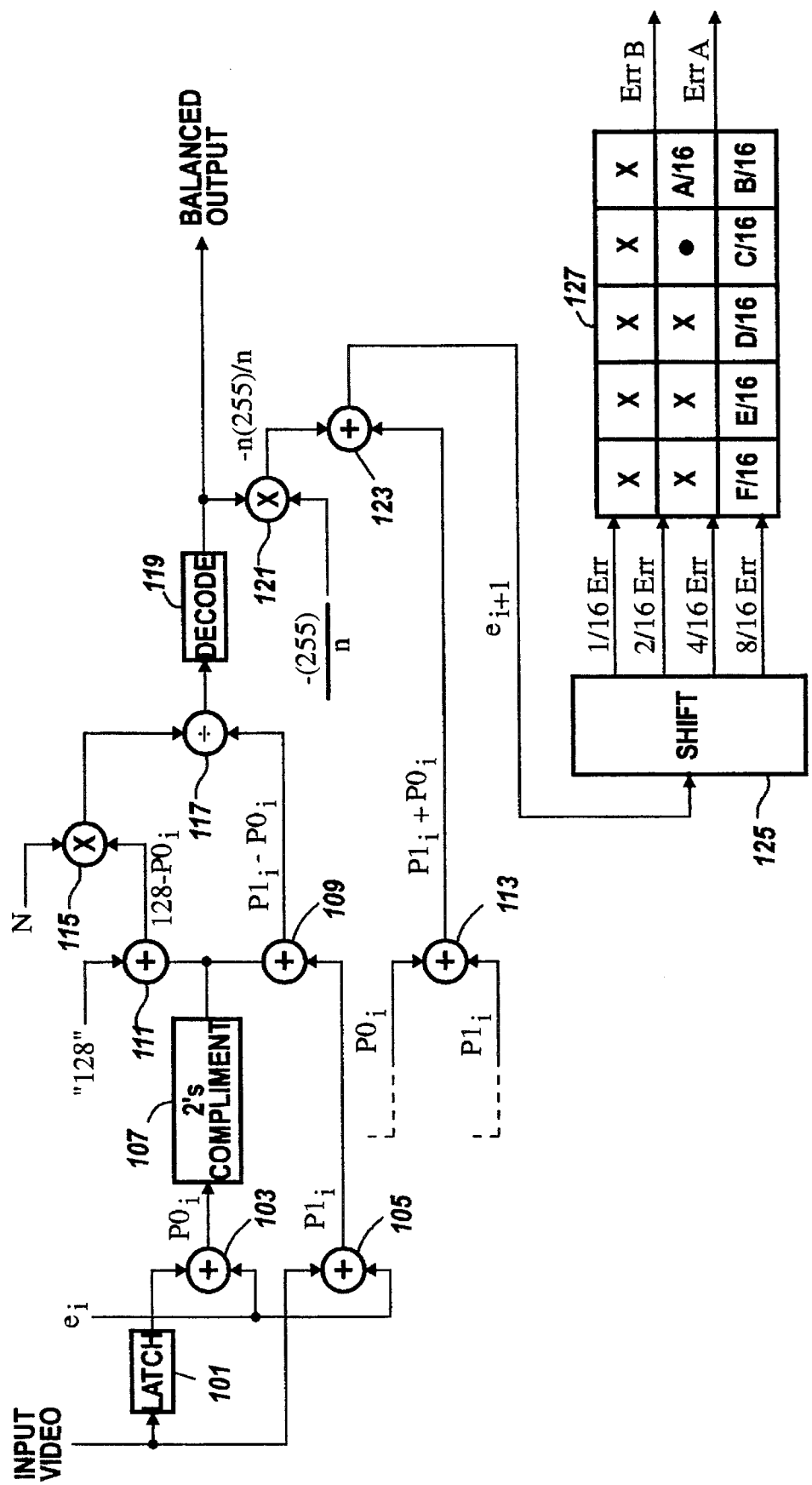
FIG. 17 shows a block diagram illustrating one embodiment of the present invention implementing a high addressability error diffusion process.

In FIG. 17, the input video signal is split and latched in latch 101 so as to produce the pixel value $V0_i$ and $V1_i$. $V0_i$ represents the latched input video signal $V1_i$, in other words, $V0_i$ represents the pixel value just proceeding the pixel value $V1_i$ in the same same scanline. The pixel value $V0_i$ is fed into an adder 103 with the error component $e_i$. Moreover, the error component $e_i$ is fed into an adder 105 along with the input video signal $V1_i$. The adder 103 produces an output signal $P0_i$ which is fed into a 2-complements circuit 107 to produce negative $P0_i$. Negative $P0_i$ is fed into an adder 109 along with the value $P1_i$ to produce the value of $P1_i-P0_i$. Negative $P0_i$ is also fed into adder 111 which is summed with the threshold value. In this example, the threshold value is 128.

The sum from adder 111 is fed into multiplier 115 so that the value ($128-P0_i$) can be multiplied by the high addressability characteristic value N. The resulting product is then divided by the sum from adder 109 by a divider circuit 117. The resulting quotient is represented by n and fed into a decoder 119. The actual function of decoder 119 is graphically illustrated in FIG. 18.

Figure 18:
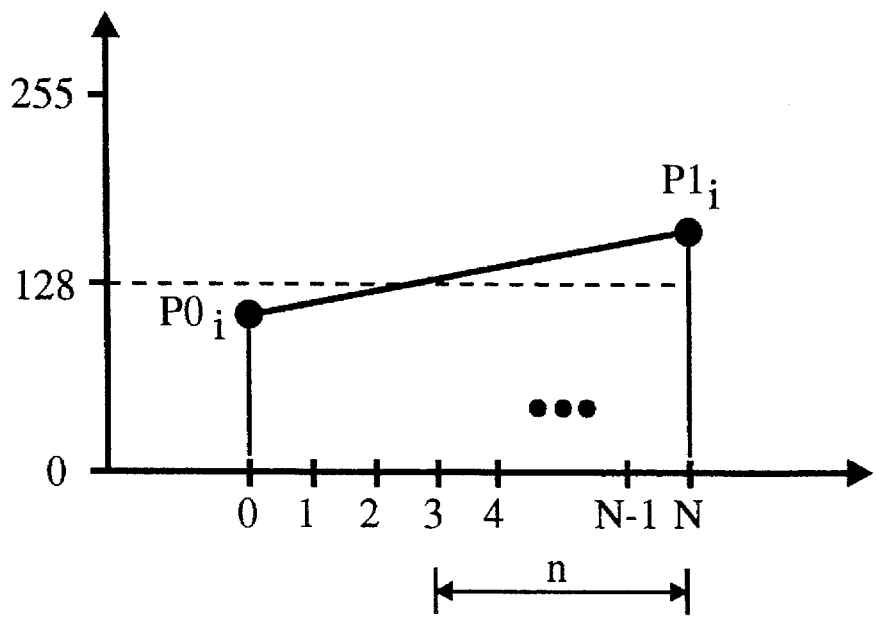
FIG. 18 shows a graphical representation illustrating a decoding process illustrated in FIG. 17.

More specifically, the decoder 119, as illustrated in FIG. 18, determines the intersection of the $P0_i/P1_i$ line and the value 128. From the determination of this intersection, the decoder 119 determines the number of subpixels n which are turned ON. The results from decoder 119 are fed as binarized output to a print engine and also to a multiplier 121.

Multiplier 121 multiplies the output from decoder 119 with the value ($-255/N$). The product of multiplier 121 is added to a sum generated by an adder 113 in adder 123. Adder 113 adds the values $P0_i$ and $P1_i$ to produce the value $P1_i+P0_i$.

The results of adder 123 represents the error component $e_{i+1}$ which is fed into a simple bit shifting circuit 125 to produce various error values that will be utilized in the distribution process. The error values generated by the bit shifting circuit 125 are fed into an error distribution circuit 127, wherein half the error $Err_B$ is distributed to the next pixel in the same scanline and the other half of the error $Err_A$ is distributed to various pixels in the next scanline according to the weighting coefficients established in the error distribution circuit 127.

Again, this hardware implementation of the high addressability error diffusion assumes that there are no time constraints, that there are no system's throughput specification requiring clock cycles exceeding 50 megahertz, or that the system has a microprocessor capable of operating at an instruction per second rate greater than 100 mips (million instructions per second). However, as noted above, typical image rendering devices have clock cycles which exceed 50 megahertz and require all image processing of a single pixel to be completed within approximately 20 nanoseconds of time to operate in realtime; i.e., within the throughput specifications of mid-volume to high volume printing systems.

To meet the time constraints imposed by present day rendering devices, the present invention decomposes the computation of the high addressability error diffusion method into two categories. The first category includes all computations which can be performed on the interpolated video signal including all possible subpixel error calculations outside or prior to entering a feedback path, and the second category is calculations which include the remaining computations that must be performed within one clock cycle (i.e., inside the feedback path). To realize this decomposition, the diffused error value is broken into two components, one component being the sum error which is stored and readily available in the FIFO buffer, namely $e_{FIFO}$, and the other is the fast scan feedback error component, $e_{FB}$, passed from binarizing of the neighbor pixel immediately preceding the pixel being processed in the fast scan direction.

With respect to these two categories, FIGS. 19–22 represent the computations which can be performed prior to entering the feedback loop, while FIGS. 23–27 are the computations which are performed within one clock cycle or within the feedback loop. Moreover, it is noted that some of these computations are performed in parallel. The parallel computations will be discussed with respect to FIGS. 19–27.

Figure 19:
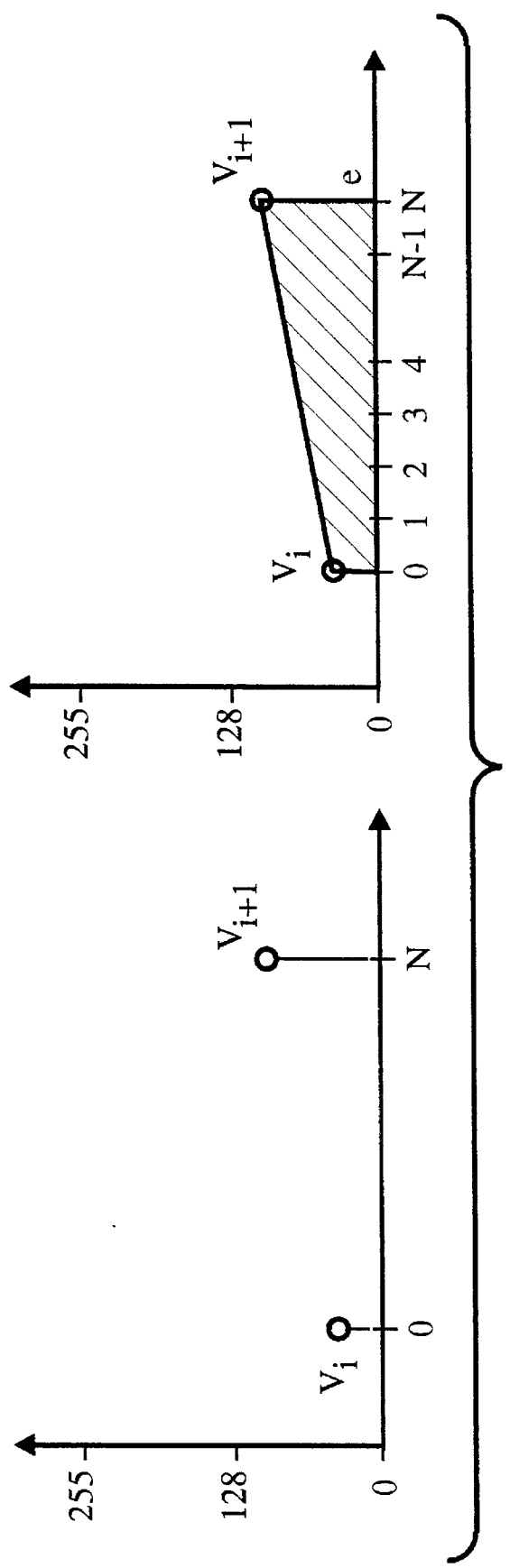
FIG. 19 shows a graphical representation of the preferred embodiment of the present invention illustrating the obtaining boundary subpixel values in parallel with the computing a desired output value.
Figure 20:
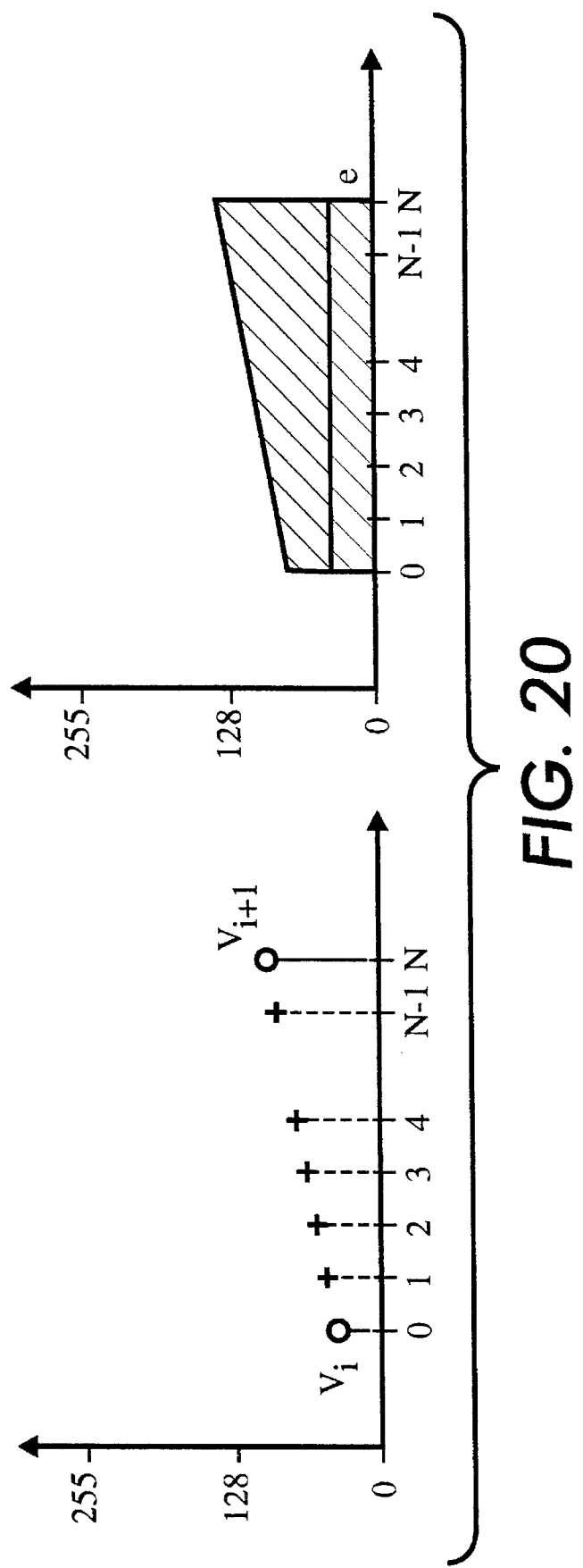
FIG. 20 shows a graphical representation of the preferred embodiment of the present invention illustrating of interpolating subpixel values between the obtained boundary subpixel values in parallel with the modifying of the desired output value with an error component.
Figure 22:
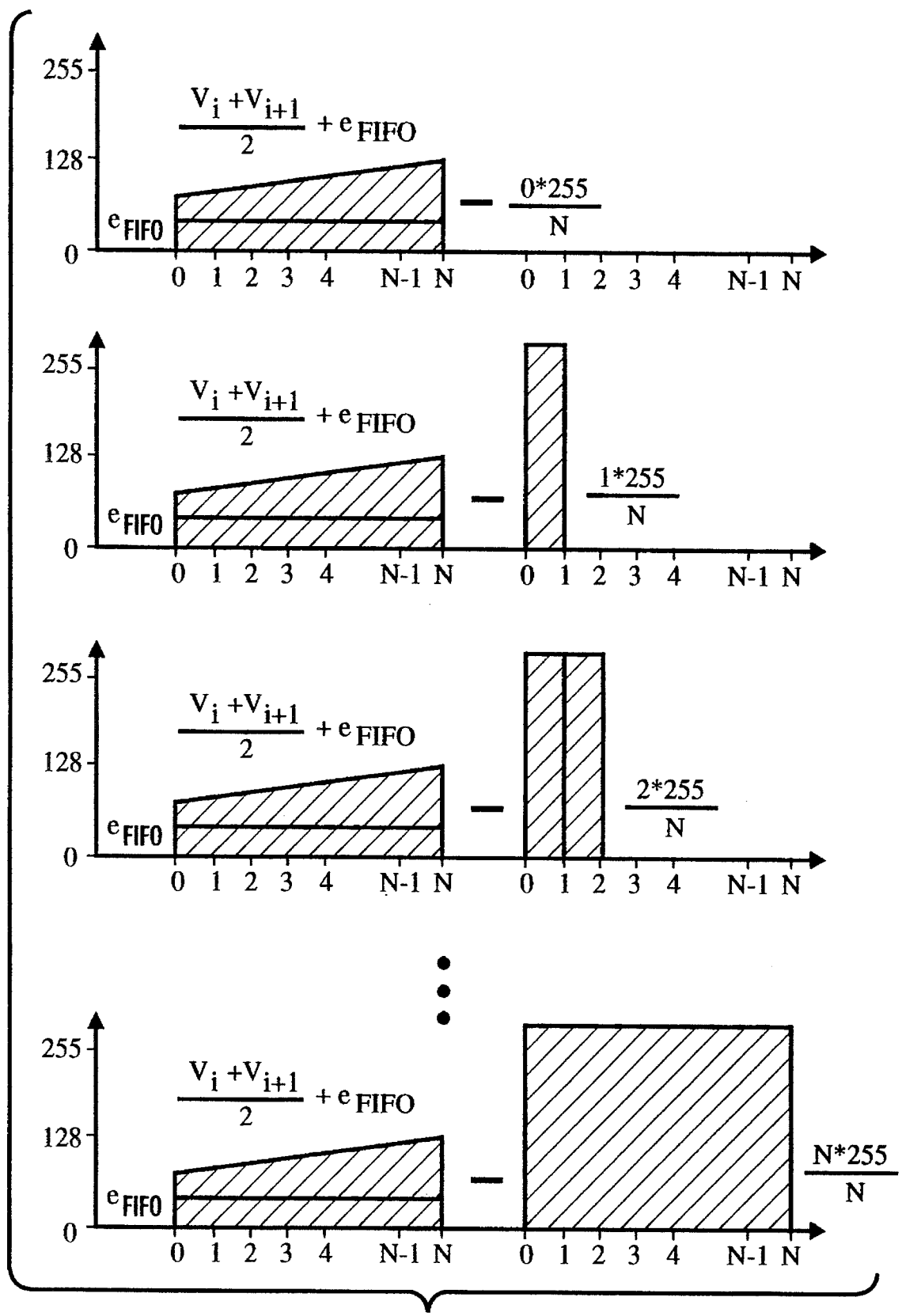
FIG. 22 shows a graphical representation of the preferred embodiment of the present invention illustrating the calculation of a plurality of partial possible error values.

FIG. 19 illustrates two such parallel computations which are carried out in the present invention. More specifically, FIG. 19 illustrates that the pixel values $V_i$ and $V_{i+1}$ are obtained in parallel to the beginning of the computation of the desired output for a single subpixel wherein the desired output is computed without including the diffused error components $e_{FIFO}$ or $e_{FB}$.

After these parallel computations are completed, the preferred embodiment of the present invention computes the interpolated subpixel values in the same way as illustrated in FIG. 11. However, in parallel with this computation of the interpolated subpixel values, the desired output is continued to be computed by adding the error component $e_{FIFO}$. This, is graphically represented in FIG. 20.

Figure 21:
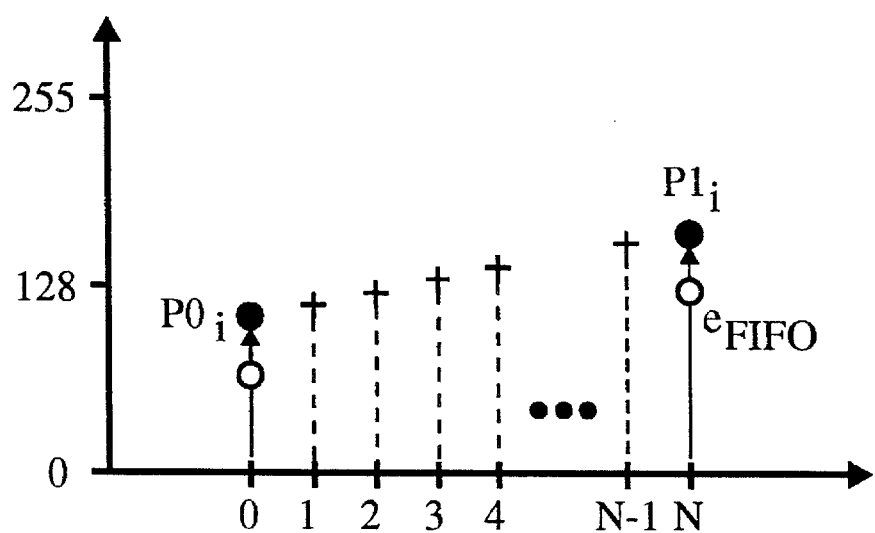
FIG. 21 shows a graphical representation of the preferred embodiment of the present invention illustrating of modifying the subpixel values between the obtained boundary subpixel values with an error component.

Next, the error component $e_{FIFO}$ is added to the pixel values $V_i$, and $V_{i+1}$ and the interpolated subpixels as illustrated in FIG. 21. At the same time (in parallel thereto), all possible actual subpixel outputs are subtracted from the desired output without including the diffused error component $e_{FB}$. In other words, N possible actual subpixel outputs are subtracted from the desired output computed in FIG. 20 to produce N possible error outputs $e_p$ (the desired output minus the actual output is equal to the error $e_p$). The computations illustrated in FIG. 21 are carried out in parallel with the computations illustrated in FIG. 22. It is further noted that the computations illustrated in FIGS. 19–22 are implemented outside the feedback loop.

Figure 23:
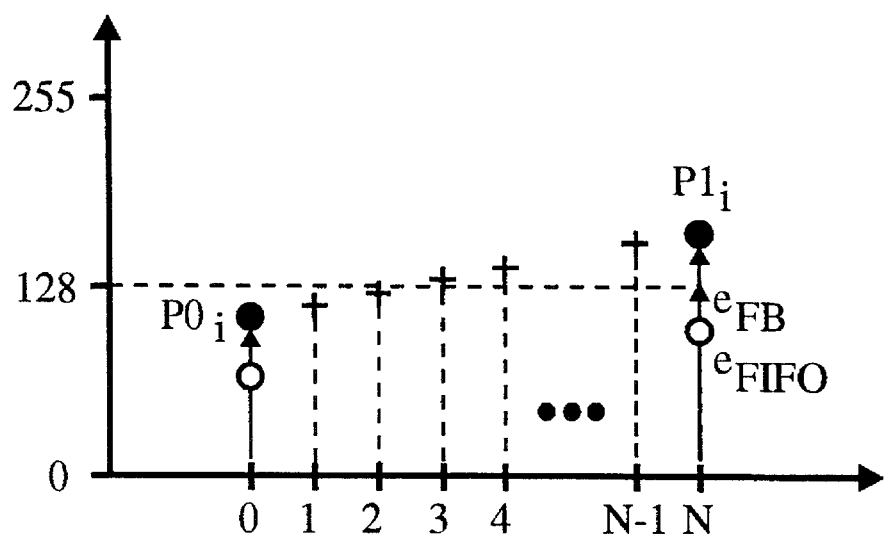
FIG. 23 shows a graphical representation of further modifying the modified subpixel values of FIG. 13 with another error component.
Figure 24:
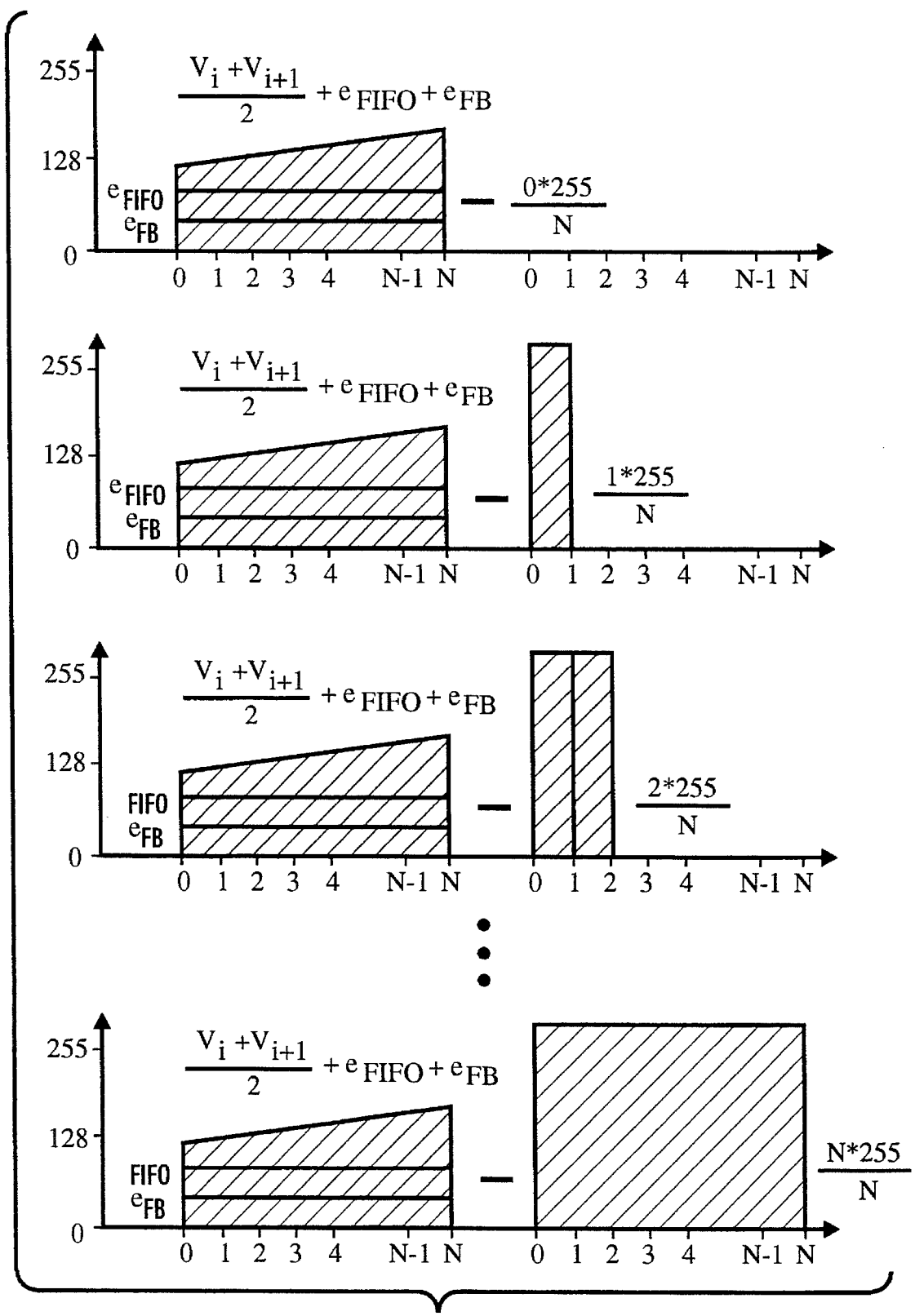
FIG. 24 shows a graphical representation of the preferred embodiment of the present invention illustrating the calculation of a plurality of complete possible error values.

Within the feedback loop, the computations are illustrated by FIGS. 23–27. Initially, within the feedback path, the error component $e_{FB}$ is added to the pixel values $V_i$, $V_{i+1}$, and the various interpolated subpixel values as illustrated in FIG. 23. At the same time that the feedback error component $e_{FB}$ is being added in FIG. 23, the error component $e_{FB}$ is added to all possible subpixel desired outputs as illustrated in FIG. 24. In other words, the error component $e_{FB}$ is individually added to all N error results ($e_p$) stemming from the calculations illustrated by FIG. 22.

Figure 25:
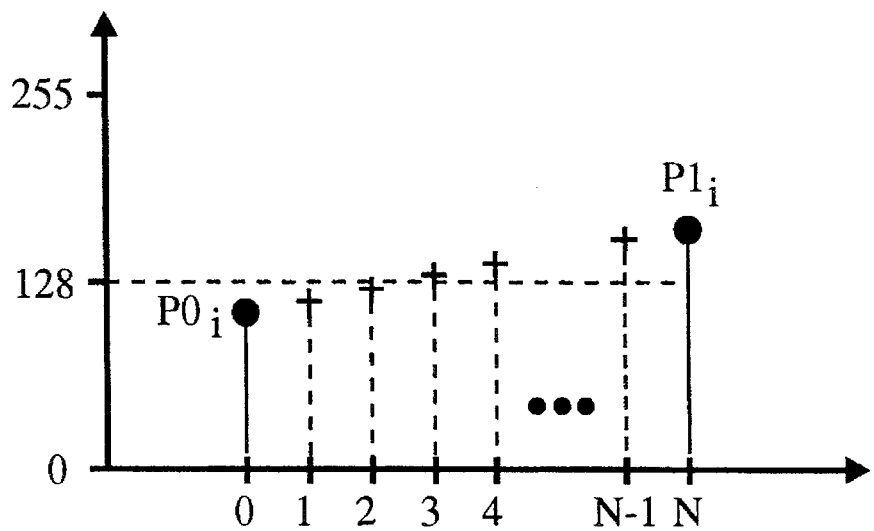
FIG. 25 shows a graphical representation of thresholding the further modified subpixel values.
Figure 26:
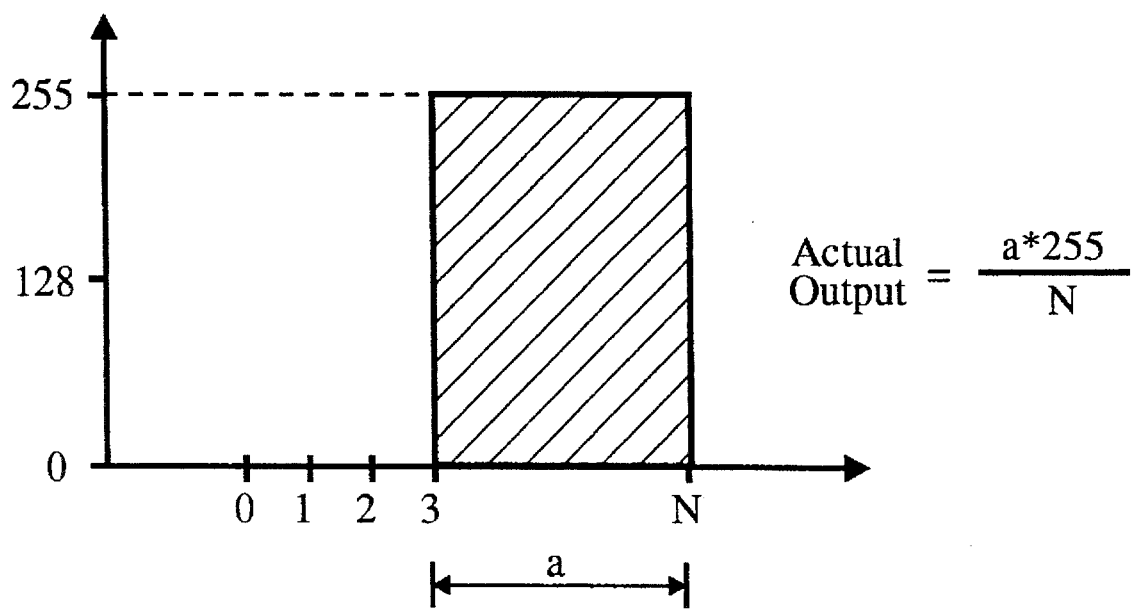
FIG. 26 shows a graphical representation of determining of number of subpixels exceeding or equal to a threshold value.
Figure 27:
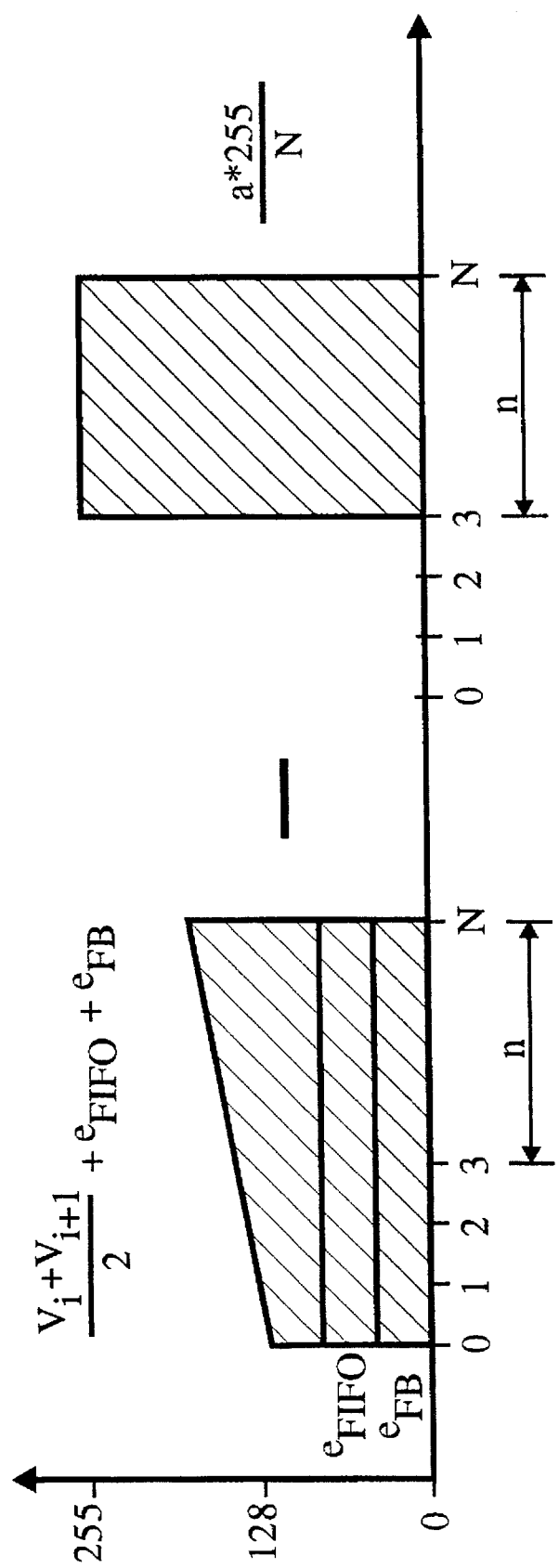
FIG. 27 shows a graphical representation of selecting one of the plurality of possible complete error values.

After completing these parallel computations, the next step includes the computations illustrated in FIGS. 25, 26, and 27. In this next step, each interpolated subpixel value is compared to a threshold value of 128, and the subpixels having a value greater than or equal to the threshold value are turned ON. This process is graphically illustrated in FIG. 25 and 26 wherein FIG. 25 shows the comparison of the interpolated subpixel values with the threshold values, and FIG. 26 shows the turning ON of the subpixels which have a value greater than or equal to the threshold value.

Since all the possible error values were made simultaneously available as a result of the computations illustrated in FIG. 24, the error to be propagated downstream can now be immediately selected; i.e., via a multiplexer, based upon the number of subpixels which are turned ON. In other words, FIG. 27 illustrates the properly selected error value from the various simultaneously available error values produced by the computations illustrated in FIG. 24. The selected error value is then distributed to downstream pixels utilizing any conventional error diffusion technique. In the preferred embodiment of the present invention, the error is distributed to downstream pixels utilizing the error diffusion coefficients discussed above.

Figure 28:
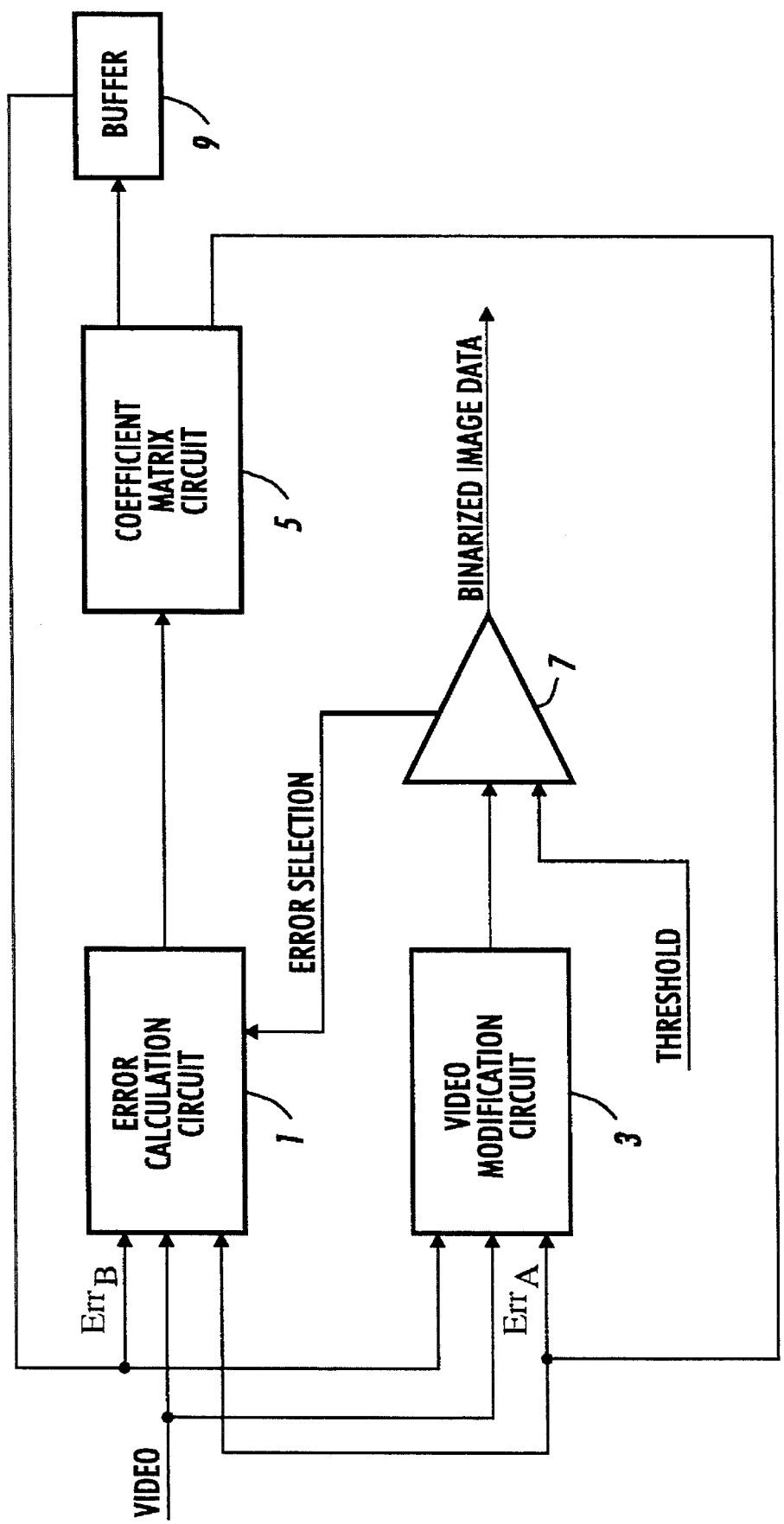
FIG. 28 is a block diagram illustrating implementation of the processes illustrated in FIGS. 19–27.

FIG. 28 illustrates a functional block diagram of the parallel pipeline high addressability error diffusion circuit of the preferred embodiment of the present invention. In FIG. 28, the input video signal is fed into an error calculation circuit 1 and a video modification circuit 3. The error components $e_{FIFO}$ (Err$_B$) and $e_{FB}$ (Err$_A$) are also fed into the error calculation circuit 1. The error calculation circuit calculates all the various possible error values that can result from the presently occurring binarization process. The selection of the proper error to be output by the error calculation circuit 1 is based upon the received error selection signal which will be discussed in more detail below.

The selected error value from the error calculation circuit 1 is fed into a coefficient matrix circuit 5 which distributes the error based upon a set of weighting coefficients. The coefficient matrix circuit 5 splits the error values into the two components $e_{FIFO}$ (Err$_B$) and $e_{FB}$ (Err$_A$). As noted before, the feedback error, Err$_A$, is fed back to the video modification circuit 3 and the error calculation circuit 1 from the coefficient matrix circuit 5. The video modification circuit 3 also receives the Err$_B$ from buffer 9.

The video modification circuit 3 produces the interpolated subpixel values for the high addressability error diffusion method wherein the interpolated subpixel values are fed into the .binarization circuit 7 along with a threshold value. In the preferred embodiment of the present invention, the threshold value is 128. However, it is noted that this threshold value can be any value.

The binarization circuit 7 binarizes the inputted video data so as to output binarized image data for the utilization by an image rendering device. The binarization circuit 7 also produces the error selection signal which is utilized by the error calculation circuit 1 to choose the correct error value to be fed to the coefficient matrix circuit 5. This error selection signal represents the number of interpolated subpixels which are turned ON during the binarization process. Thus, the error calculation circuit 1 may include a multiplexer to make this selection.

As illustrated in FIG. 28, the error calculation circuit 1 is in parallel with the video modification circuit and the binarization circuit. Moreover, the high addressability error diffusion architecture of the present invention is implemented on an ASIC, thereby enabling hardware implementation so that the image data can be binarized within the time constraints and throughput specifications of a high speed image rendering device.

Figure 29:
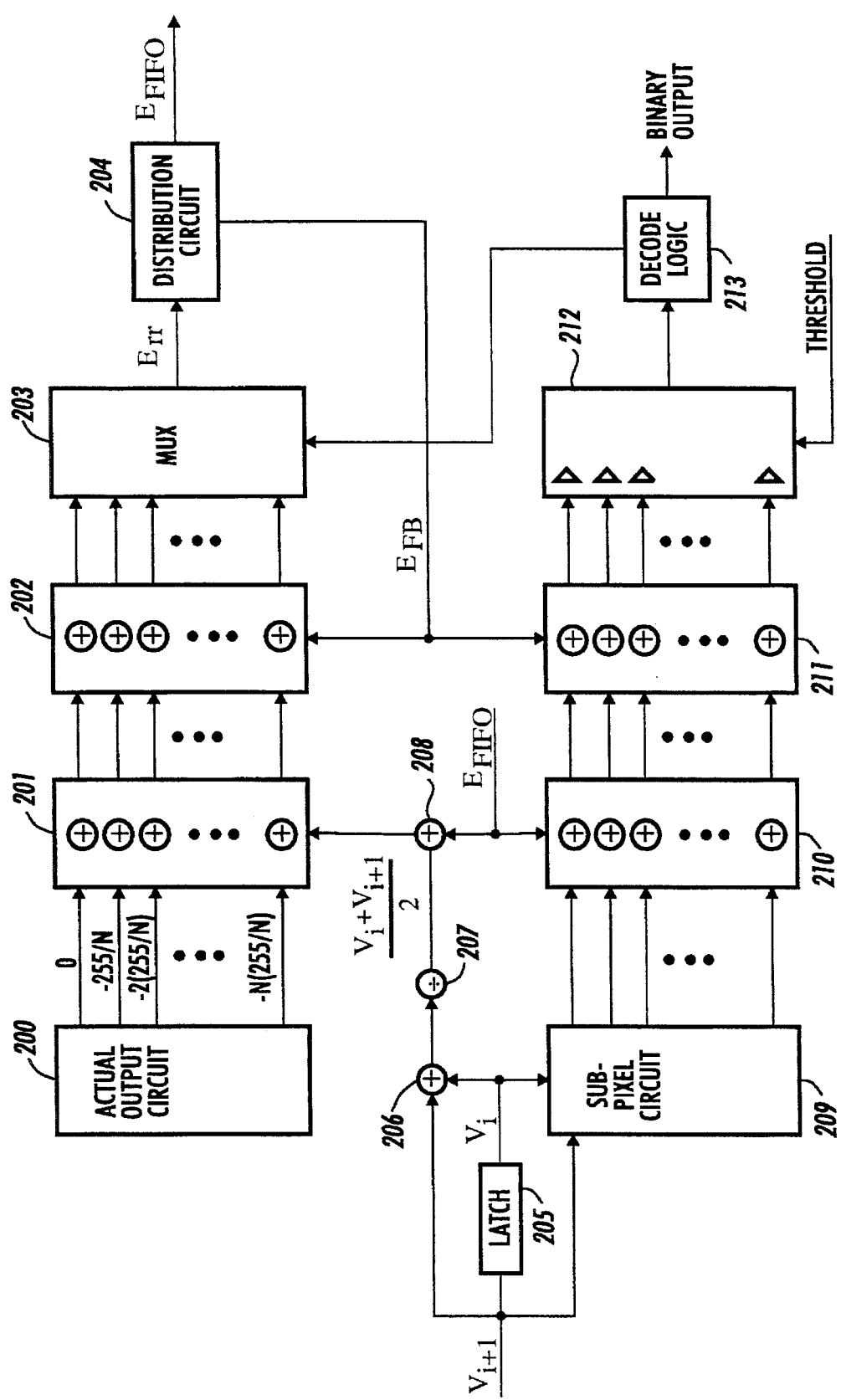
FIG. 29 is a block diagram illustrating circuitry implementation of the processes illustrated in FIGS. 19–27.

FIG. 29 illustrates a detail block diagram of the circuit of the preferred embodiment of the present invention. As illustrated in FIG. 29, many of the computations, as previously described with respect to FIGS. 19–27, are carried out in parallel.

Pixel values $V_i$ and $V_{i+1}$ are obtained by the utilization of a latch 205 which latches the video signal so that two adjacent fast scan pixels are available for processing. The pixel values $V_i$ and $V_{i+1}$ are summed in adder 206 and the sum is divided in half by divider 207. The result from divider 207 is fed into adder 208 with the error term $e_{FIFO}$. The sum represents the desired output to the printer.

In parallel to the above described process, an actual output generation circuit 200 produces all possible outputs to the printer based on the high addressability characteristic. It is noted that these values are negative since an adder is used for substraction operations. If the high addressability characteristic is N, N possible actual outputs will be generated. Also in parallel to the above described process, a subpixel circuit generated all the interpolated subpixels based on the pixel values $V_i$ and $V_{i+1}$.

Next, the error component $e_{FIFO}$ is added to each of the interpolated subpixels by adder 210. At the same time (in parallel thereto), each possible actual outputs (negative values) is individually added to the desired output by adder 201. In other words, N possible actual subpixel outputs are subtracted from the desired output to produce N possible error outputs.

In adders 211 and 202, a feedback error term $e_{FB}$ is added to each summation from adders 210 and 201, respectively. These computations are carried out in parallel. After completing these parallel computations, each interpolated subpixel from adder 211 is compared to a threshold value in threshold circuit 212. The subpixels having a value greater than or equal to the threshold value are turned ON. Threshold circuit outputs a number representing the number of sub pixels turned ON. This information is fed into a decode logic circuit which produces a binary therefrom to be sent to a printer.

Moreover, the error terms from adder 202 are fed into a multiplexer 203 which chooses which error term to propagate to down stream pixels. The error term is selected based on a control signal received from the decode logic circuit 213. The selected error term is fed into a distribution circuit 204 which produces the next feedback error and the error to be stored in a buffer for utilization in the processing of the next scanline.

This process is also applicable to an image processing system which combines screening with high addressability error diffusion. A full description of the screening and high addressability error diffusion process is disclosed in co-pending U.S. Patent Application, U.S. patent application Ser. No. 08/285,328, filed concurrently herewith and will be discussed below.

Image information, be it color or black and white, is commonly derived by scanning, initially at least, in a grey level format containing a large number of levels, e.g.: 256 levels for black and white and more than 16 million $256^3$) levels for color. This multi-level format is usually unprintable by standard printers.

The term "grey level" is used to described such data for both black and white and color applications. Standard printers print in a limited number of levels, either a spot or a no spot in the binary case, or a limited number of levels associated with the spot, for example, four in the quaternary case. Since grey level image data may be represented by very large values, it is necessary to reduce grey level image data to a limited number of levels so that it is printable. Besides grey level image information derived by scanning, certain processing techniques, such as computer generation, produce grey level pixel values which require such a conversion.

One standard method of converting grey level pixel image data to binary level pixel image data is through the use of screening, dithering or halftoning. In such arrangements, over a given area, each grey level pixel within the area is compared to one of a set of preselected thresholds. The set of thresholds comprises a matrix of threshold values or a halftone cell.

Figure 30:
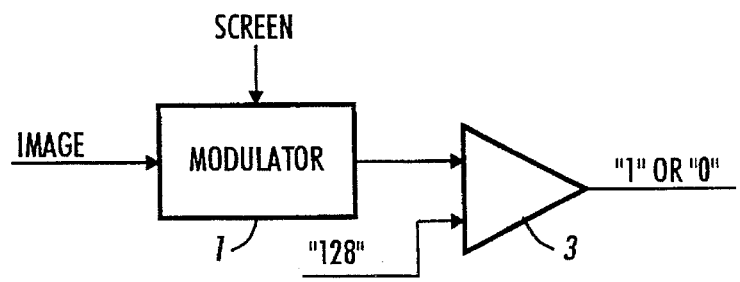
FIG. 30 shows a block diagram illustrating a typical screening circuit.

FIG. 30 illustrates a block diagram of a typical screening circuit. In this circuit, an unmodified image or video signal is fed into a modulation circuit 1 with a screen value from a halftone screen matrix to produce a modified signal. The modified signal is then thresholded by a binarization circuit 3 to produce a binary output. The binary output represents either the ON or OFF characteristic of the processed pixel.

In this process, the sampled image picture elements are compared with a single threshold, and a black/white decision is made. However, the threshold relationship is modified by modulating the image data with the screen data. The screen data is selected in sequential order from a two-dimensional matrix defined as a halftone cell threshold set. The set of screen values and the arrangement therein determine the grey scale range, frequency, angle, and other properties of the halftone pictorial image.

The effect of such an arrangement is that, for an area where the image is grey, some of the thresholds within the matrix will be exceeded, while others are not. In the binary case, the portions of the matrix, or cell elements, in which the thresholds are exceeded are printed as black, while the remaining elements are allowed to remain white or viceversa. The effect of the distribution of black and white over the cell is integrated by the human eye as grey.

However, typical screening presents problems in that the amount of grey within an original image is not maintained exactly over an area because the finite number of elements inside each halftone cell only allows the reproduction of a finite number of grey levels. The error arising from the difference between the threshold value and the actual grey level value at any particular cell is, typically, thrown away. This results in loss of image information and creates significant image artifacts, such as banding or false contours that can be seen in smooth image areas. In banding, the image input grey level varies smoothly over an area while the halftoned image has to make a transition from one halftone dot (grey level) to another. This transition can clearly be seen as a band or contour running through smooth image parts.

Another problem associated with screening grey images is the trade-off between the screen frequency and the number of grey levels available. Although it is desirable to use a high frequency screen, the number of grey levels available decreases as the screen frequency increases. One method which has been proposed to increase the number of grey levels as the screen frequency increases is set forth in U.S. Pat. No. 5,317,653 to Eschbach et al. The entire contents of U.S. Pat. No. 5,317,653 are hereby incorporated by reference.

In this method, the grey image is first reduced to a small number of grey levels with error diffusion, and then a line screen with a small number of grey levels and a high frequency is used. This two step process binarizes the image.

However, to implement such a method, a print engine or system requires a multi-level error diffusion process followed by screen thresholding. Typically, the image processing architecture for such machines do not have such a capability. Therefore, it is desirable to achieve the same results, but without departing from the typical image processing architecture of printing system.

Typically, the image processing architecture of a printing system uses either the functions of screening, thresholding, or error diffusion. For pixels to be thresholded, a modified video signal, $V_T'$, is computed from the pixel video signal V. The modified video signal, $V_T'$, is defined as $V_T'=(T+255-V)/2$. In this definition, T is the desired threshold level. It is noted that for T and V between 0 and 255, the computed V' will also be in the range of 0 to 255.

For pixels to be screened, a similar modified video signal, $V_S'$, is computed from the pixel video signal V and the screen value S at the pixel location. The modified video signal, $V_S'$, for a screening process is defined as $V_S'=(S+255-V)/2$. The screen value S depends on the pixel location as well as the halftone screening pattern being used. It is noted that either a line screen or a dot screen can be used.

For pixels to be rendered by error diffusion, the modified video signal is simply the video signal inverted. More specifically, the modified video signal is defined as $V_{ED}'=255-V$.

In the final step of binarization, all the modified video signals; $V_T'$, $V_S'$, and $V_{ED}'$; are compared with 128 to determine the ON or OFF characteristics of the pixel. Namely, if the modified video signal is greater than or equal to 128, the pixel should be OFF (black), otherwise it should be ON (white). It is noted that this gives the same result as the more typical approach of comparing the video V itself with the threshold T or the screen values S. In the case of error diffusion, the appropriate error propagated from the previous pixels must be added to V' before comparing with 128 and the error to be propagated to downstream pixels must also be computed afterwards.

However, as noted above, it is desirable to screen the video signal at a higher frequency while maintaining the available number of grey levels. To realize this result, the present invention utilizes a screening process prior to an error diffusion process. More specifically, the modified video signal $V_S'$ is first computed utilizing the screening method disclosed above. This computation uses screen values from a small one-dimensional screen cell. After computing the modified video signal $V_S'$, the screened modulated video signal $V'$ is processed by an error diffusion process. In the preferred embodiment of the present invention, this error diffusion process is a high addressability error diffusion process.

Figure 31:
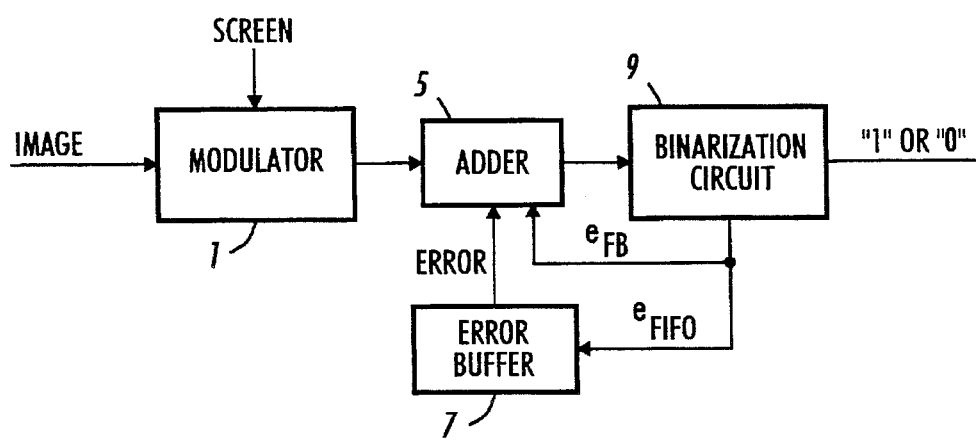
FIG. 31 shows a block diagram illustrating the binarization process of the present invention.

FIG. 31 illustrates a circuit which performs the screening/error diffusion process of the present invention. In FIG. 31, an unmodified video or image signal is screened in modulator 1 to produce a modified signal $V_S'$ using the preferred equation of $V_S'=(S+255-V)/2$ wherein S is equal to screen values derived from a halftone screen pattern.

This modified signal $V_S'$ is fed into adder 5 where the signal is further modified by the addition of an error value propagated from upstream processed pixel locations to produce $V_S''$ ($V_S''=V_S'+e_i$). The error component ($e_{FIFO}+e_{FB}$) utilized by adder 5 is received from error buffer 7 ($e_{FIFO}$) which stores the propagated error and binarization circuit 9 ($e_{FB}$).

The further modified signal $V_S''$ is fed into binarization circuit 9 which converts the multi-level modified signal $V_S''$ to a binary output by utilizing an error diffusion/threshold process. Some of the error ($e_{FB}$) from this process is fed back directly to the next processed pixel, while the rest ($e_{FIFO}$) is stored in the error buffer 7 for processing of pixels on the next scanline. The apportionment of the error is based on weighting coefficients. Any set of coefficients can be used. In the preferred embodiment of the present invention, the weighting coefficients are the coefficients described in co-pending U.S. patent application Ser. No. 08/167,758 to Shiau et al.

In this binarization process, the error that is produced represents the difference between the desired output, the multi-level image data value, and the actual output value which is either 255, or 0 if the multi-level of the image data is represented by 8 bits. This error is diffused, thereby retaining as much grey level information as possible.

As noted above, in the preferred embodiment, the error diffusion process is a high addressability error diffusion process; therefore, The screening/high addressability error diffusion process will be explained in more detail below. Initially, the high addressability error diffusion process will be briefly described.

In explaining the high addressability error diffusion process, it is assumed that the input grey level at pixel location i and pixel location i+1 is represented by $V_i$ and $V_{i+1}$, respectively. The pixel values are assumed to be 8 bit integers wherein, for the sake of explanation, 0 denotes white and 255 denotes black. The rendering error, at the lower resolution, that passes from upstream pixels to the downstream pixel location is denoted by $e_i$.

It is noted that a feature of high addressability involves interpolation between pixels, the creation of subpixels. This interpolation impacts the high addressability error diffusion process. More specifically, depending on the way the interpolation is done, distinct outputs can be obtained utilizing a high addressability error diffusion process. One such method of interpolation is as follows.

Initially, the modified pixel values $P0=V_i+e_i$ and $P1=V_{i+1}+e_i$ are computed. The subpixels are denoted by 0 to N−1 wherein the high addressability characteristic is N=4. The interpolated subpixel values are computed as $B_n=P0+n(P1-P0)/N$ for n=0 to N−1. The interpolated subpixel values are then compared with a threshold value which in most cases is 128, assuming that the video value ranges from 0 to 255.

If $B_n$ is greater than or equal to 128, the subpixel is turned ON; otherwise, the subpixel is turned OFF. The error to be propagated to downstream pixels is computed as the desired output, (P0+P1)/2, minus the actual output, namely, y*255/N wherein y is the number of subpixels turned ON. The error is then multiplied by a set of weighting coefficients and distributed to the downstream pixels as in the first version.

More specifically, the inputted modified video signal is divided into N subpixel units. The P0 and P1 values are computed as noted above. The computed subpixel values are compared with a threshold value, namely 128. If the subpixel value is greater than or equal to the threshold value, the subpixel value is set to the ON state. However, if the subpixel value is less than 128, the subpixel value is set to the OFF state.

Upon completing the comparison of all subpixel values, the number of ON subpixels are calculated. Moreover, the error from the threshold process is calculated so that the value represents the original lower spatial resolution. Upon calculating the error, the error is multiplied by weighting coefficients and distributed the error to downstream pixels.

It is noted that when performing the high addressability error diffusion process on the screen modulated video signal, $V_S'$, the black and white levels assumed in a typical error diffusion process need to be modified. The actual modifications are as follows.

Figure 32:
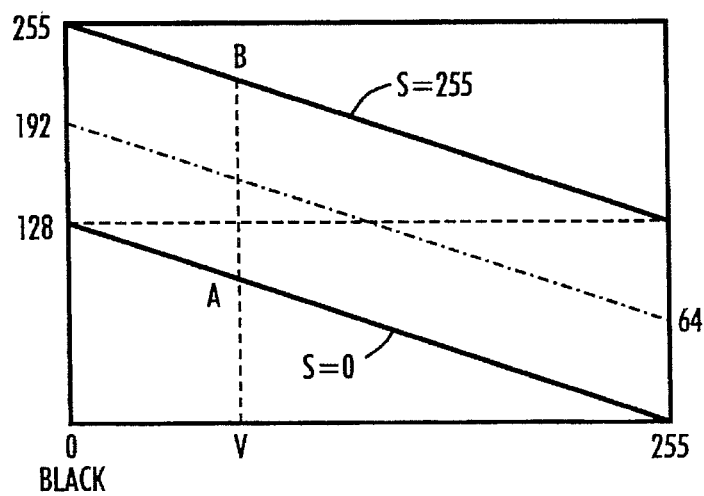
FIG. 32 shows a graphic representation of the screening process carried out by the present invention.

The conversion from the pixel video signal V to the screen modulated signal $V_S'$ is depicted in FIG. 32. For a fixed video signal V, the screen modulated video signal $V_S'$ has values varying between the levels A and B as the screen value S vary between 0 and 255. Thus, the effective white and black values to be used in the error diffusion process or calculation should be, in this example, for the value of white, 64 and, for the value of black, 192. This is different from the typical error diffusion values, where the white value would be V'=0 and the black value would be V'=255.

Figures 33, 34, 35:
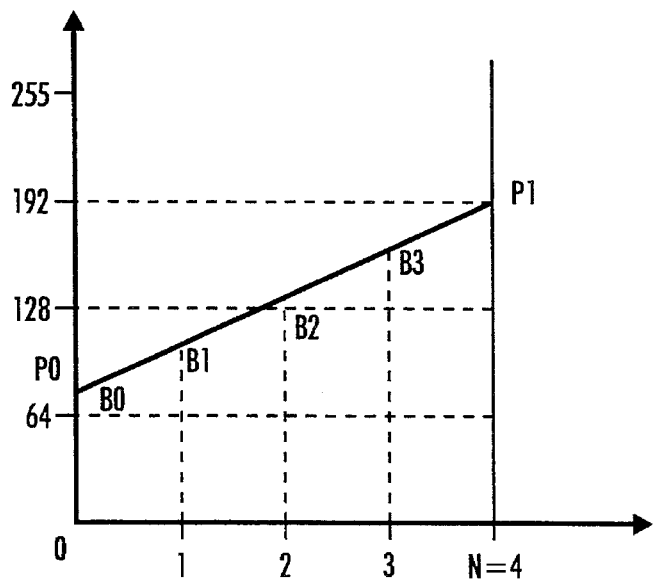
FIG. 33 shows a graphical representation illustrating the interpolation and binarization processes utilized in the present invention.
FIG. 34 shows a graphic representation illustrating a vertical line screen pattern.
FIG. 35 shows a graphical representation illustrating a diagonal line screen pattern.

The high addressability error diffusion process used in conjunction with the screening process will be further explained in conjunction with FIG. 33. In this explanation, the value $e_i$ represents the rendering error propagated to the present i-th pixel from the previous pixels. At the i-th pixel location, the subpixel values are given by $P0=V_S'i+e_i=V_S''i$ and $P1=V_S'_{i+1}+e_i=V_S''_{i+1}$. The values are used to obtain the interpolated values $B0$ to $B_{N-1}$, as shown in FIG. 4. It is noted that the high addressability factor illustrated in FIG. 33 is N=4.

These interpolated values are then compared with 128 to determine the ON or OFF characteristics of the subpixels. If the number of subpixels rendered as black is indicated by n, the current rendering error is given by the desired output minus the actual output, $e'_i=((P0+P1)/2)-64-(n(192-64)/N)$. In other words, the actual output is defined as the desired output, (P0+P1)/2−64, minus the product of the number of ON subpixels and the difference between the black and white reference values divided by the high addressability characteristic. This new error is then multiplied by a set of weighting coefficients and the weighted errors are propagated to the downstream pixels. To determine the ON or OFF characteristics, the subpixel values are processed by a number of comparison steps.

The combined screening and high addressability error diffusion rendering of the present invention can be utilized using a simple vertical line screen pattern as illustrated in FIG. 34. Moreover, the present invention can be utilized with a 45° line screen as illustrated in FIG. 35. The present invention can also be utilized with a dot screen or a constant screen. In the preferred embodiment of the present invention, a dot screen is utilized in a continuous tone region and a constant screen will be used in a text region to emulate a simple error diffusion process. This creates smoother transitions from window-to-window or from effect-to-effect since the error stored in the buffer will be within the same range for both continuous tone and text regions.

No matter what type of screen is used, the present invention is capable of realizing the characteristics of a high frequency screen while maintaining a high number of grey levels available for printing by the printing system. Thus, the present invention reduces the contouring artifacts typically observed with screens of limited grey level and is able to realize such a feature without affecting the typical image processing architecture of a printing system.

In the circuit implementation, the input video signal is input into an error calculation circuit and a video modification circuit. An error component $e_{FIFO}$, is also fed into the error calculation circuit. The error calculation circuit calculates the various possible error values that can result from the presently occurring binarization process. The selection of the proper error to be output by the error calculation circuit is based upon a received error selection signal which will be discussed in more detail below.

The selected error value from the error calculation circuit is fed into a coefficient matrix circuit which distributes the error based upon a set of weighting coefficients. The coefficient matrix circuit splits the error values into the two components $e_{FIFO}$ and $e_{FB}$. The feedback error, $e_{FB}$, is output from the coefficient matrix circuit and fed back to the video modification circuit. The video modification circuit also receives $e_{FIFO}$ from a buffer.

The video modification circuit produces the interpolated subpixel values for the high addressability error diffusion method wherein the interpolated subpixel values are fed into the binarization circuit along with a threshold value. In the preferred embodiment of the present invention, the threshold value is 128. However, it is noted that this threshold value can be any value.

The binarization circuit binarizes the inputted video data so as to output binarized image data for utilization by an image rendering device. The binarization circuit also produces the error selection signal which is utilized by the error calculation circuit to choose the correct error value to be fed to the coefficient matrix circuit. This error selection signal represents the number of interpolated subpixels which are turned ON during the binarization process. Thus, the error calculation circuit may include a multiplexer to make this selection.

The error calculation circuit is in parallel with the video modification circuit and the binarization circuit. Thus, the high addressability error diffusion method can be readily implemented in hardware so that the image data can be binarized within the time constraints and throughput specifications of a high output image rendering device.

In describing the present invention, the terms pixel and subpixel have been utilized. These terms may refer to an electrical (or optical, if fiber optics are used) signal which represent the physically measureable optical properties at a physically definable area on a receiving medium. The receiving medium can be any tangible document, photoreceptor, or marking material transfer medium. Moreover, the terms pixel and subpixel may refer to an electrical (or optical, if fiber optics are used) signal which represent the physically measureable optical properties at a physically definable area on a display medium. A plurality of the physically definable areas for both situations represent the physically measureable optical properties of the entire physical image to be rendered by either a material marking device, electrical or magnetic marking device, or optical display device. Lastly, the term pixel may refer to an electrical (or optical, if fiber optics are used) signal which represents physical optical property data generated from a single photosensor cell when scanning a physical image so as to convert the physical optical properties of the physical image to an electronic or electrical representation. In other words, in this situation, a pixel is an electrical (or optical) representation of the physical optical properties of a physical image measured at a physically definable area on an optical sensor.

Although the present invention has been described in detail above, various modifications can be implemented without departing from the spirit of the present invention. For example, the preferred embodiment of the present invention has been described with respect to a printing system; however, this error diffusion method is readily implemented in a display system. Moreover, the high addressability error diffusion method of the present invention can be readily implemented on an ASIC, thereby enabling the placement of this process in a scanner, electronic subsystem, printer, or display device.

Moreover, the present invention has been described with respect to a video range of 0 to 255. However, it is contemplated by the present invention that the video range can be any suitable range to describe the grey level of the pixel being processed. Furthermore, the present invention is readily applicable to any rendering system:, not necessarily a binary output device. It is contemplated that the concepts of the present invention are readily applicable to a four-level output terminal or higher.

Lastly, the present invention has been described with respect to a monochrome or black/white environment. However, the concepts of the present invention are readily applicable to a color environment. Namely, the high addressability error diffusion process of the present invention can be applied to each color space value representing the color pixel.

In recapitulation, the present invention provides a high addressability error diffusion method or module which enables an image processing system to convert an electronic document of one format to that of another format.

While the present invention has been described with reference to various embodiments disclosed herein before, it is not to be combined to the detail set forth above, but is intended to cover such modifications or changes as made within the scope of the attached claims.

What is claimed is:

1. A method of diffusing an error generated from thresholding a grey level value representing a pixel, comprising the steps of:

(a) receiving the grey level value representing the pixel, the grey level value having a first resolution;

(b) converting the grey level value into a predetermined number of subpixels representing a second resolution, the second resolution being higher than the first resolution;

(c) thresholding the subpixels;

(d) generating an error value as a result of a threshold determination in said step (c), the error value having a resolution corresponding to the first resolution; and (e) diffusing the error value to grey level values representing adjacent pixels.

2. The method as claimed in claim 1, wherein said step (b) comprises the substeps of:

(b1) computing a first grey level value; and (b2) computing a second grey level value.

3. The method as claimed in claim 2, wherein said step (b) further comprises the substep of:

(b3) computing a predetermined number of subpixel grey level values $B_n$, the subpixel grey level values $B_n$ being equal to $P0+n(P1-P0)/N$, wherein n is equal to 0 to $N-1$, P0 is equal to the first grey level value, P1 is equal to the second grey value, and N is equal to a high addressability characteristic.

4. The method as claimed in claim 3, wherein said step (d) comprises the substeps of:

(d1) calculating a desired output, the desired output being equal to a sum of the first and second grey level values divided by two;

(d2) calculating an actual output, the actual output being equal to a number of subpixels being equal to or greater than a threshold value multiplied by a maximum grey level value for a pixel divided by a high addressability characteristic; and (d3) calculating the error to be equal to the desired output minus the actual output.

5. A system for diffusing an error generated from thresholding a grey level value representing a pixel, comprising:

input means for receiving the grey level value representing the pixel, the grey level value having a first resolution;

high addressability means for converting the grey level value into a predetermined number of subpixels representing a second resolution, the second resolution being higher than the first resolution;

threshold means for thresholding the subpixels;

error means for generating an error value as a result of a threshold determination by said threshold means, the error value having a resolution corresponding to the first resolution; and error diffusing means for diffusing the error value to grey level values representing adjacent pixels.

6. The system as claimed in claim 5, wherein said high addressability means computes a first grey level value and a second grey level value.

7. The system as claimed in claim 6, wherein said high addressability means further computes a predetermined number of subpixel grey values $B_n$, the subpixel grey level values $B_n$ being equal to $P0+n(P1-P0)/N$, wherein n is equal to 0 to $N-1$, P0 is equal to the first grey level value, P1 is equal to the second grey level value, and N is equal to a high addressability characteristic.

8. The system as claimed in claim 5, wherein said error means comprises:

first means for calculating a desired output, the desired output being equal to a sum of the first and second grey :level values divided by two;

second means for calculating an actual output, the actual output being equal to a number of subpixels being equal to or greater than the threshold value multiplied by a maximum grey level value for a pixel divided by a high addressability characteristic; and third means for calculating the error to be equal to the desired output minus the actual output.

9. A method of generating an error from a threshold process, comprising the steps of:

(a) thresholding a predetermined number of subpixels representing a pixel grey level value, the predetermined number of subpixels representing a first resolution and the pixel grey level value representing a second resolution; and (b) generating an error value as a: result of thresholding the predetermined number of subpixels in said step (a), the error value representing the second resolution, the second resolution being lower than the first resolution.

10. The method as claimed in claim 9, further comprising the step of:

(c) diffusing the error value to grey level values of pixels adjacent to the representative pixel being thresholded.

11. A system for generating an error from a threshold process, comprising:

threshold means for thresholding a predetermined number of subpixels representing a pixel grey level value, the predetermined number of subpixels representing a first resolution and the pixel grey level value representing a second resolution; and error means for generating an error value as a result of thresholding the predetermined number of subpixels by said threshold means, the error value representing the second resolution, the second resolution being lower than the first resolution.

12. The system as claimed in claim 11, further comprising:

diffusing means for diffusing the error value to grey level values of pixels adjacent to the representative pixel being thresholded.

13. A printing system for rendering marks on a receiving medium, comprising:

receiving means for receiving a grey level signal corresponding to a pixel having a first resolution;

interpolation means for converting the grey level signal to a predetermined number of subpixels representing the pixel grey level value, the predetermined number of subpixels representing a second resolution, the second resolution being higher than the first resolution;

binarization means for binarizing the predetermined number of subpixels representing the pixel grey level value so as to output a binary signal and an error signal, the error signal having a resolution equal to the first resolution;

diffusing means for diffusing the error value to grey level signals corresponding to pixels adjacent to the pixel having the first resolution; and rendering means for converting the binary signal into a mark on the receiving medium.

\* \* \* \* \*